(12) United States Patent
Nagatomi

(10) Patent No.: US 8,264,938 B2
(45) Date of Patent: Sep. 11, 2012

(54) OPTICAL PICKUP DEVICE

(75) Inventor: Kenji Nagatomi, Kaizu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/238,286

(22) Filed: Sep. 21, 2011

(65) Prior Publication Data

US 2012/0075981 A1    Mar. 29, 2012

(30) Foreign Application Priority Data

Sep. 28, 2010  (JP) ................................. 2010-217978

(51) Int. Cl.
*G11B 7/00* (2006.01)
(52) U.S. Cl. .................... 369/112.04; 369/120
(58) Field of Classification Search .......... None
See application file for complete search history.

(56) References Cited

U.S. PATENT DOCUMENTS

| 2009/0225645 A1 | 9/2009 | Nagatomi | |
| 2010/0214902 A1* | 8/2010 | Nakano et al. | 369/112.03 |
| 2010/0265809 A1* | 10/2010 | Kimura | 369/112.03 |

FOREIGN PATENT DOCUMENTS

| JP | 2006-073042 A | 3/2006 |
| JP | 2009-211770 A | 9/2009 |

\* cited by examiner

*Primary Examiner* — Paul Huber
(74) *Attorney, Agent, or Firm* — Ditthavong Mori & Steiner, P.C.

(57) ABSTRACT

Two light flux areas are disposed in a direction along which a pair of vertically opposite angles defined by first and second straight lines are aligned, and the other two light flux areas are disposed in a direction along which the other pair of vertically opposite angles are aligned. A spectral element sets propagating directions of divided elements of each of light fluxes obtained by dividing each of the light fluxes by a third straight line intersecting with the first and second straight lines by an angle of 45 degrees, or by a fourth straight line orthogonal to the third straight line to disperse the divided elements on a photodetector. The photodetector is provided with sensors which individually receive the divided elements of the light fluxes.

5 Claims, 18 Drawing Sheets

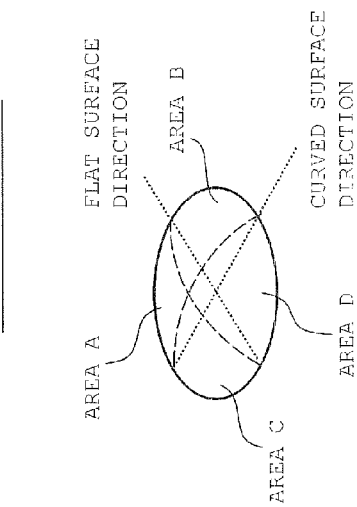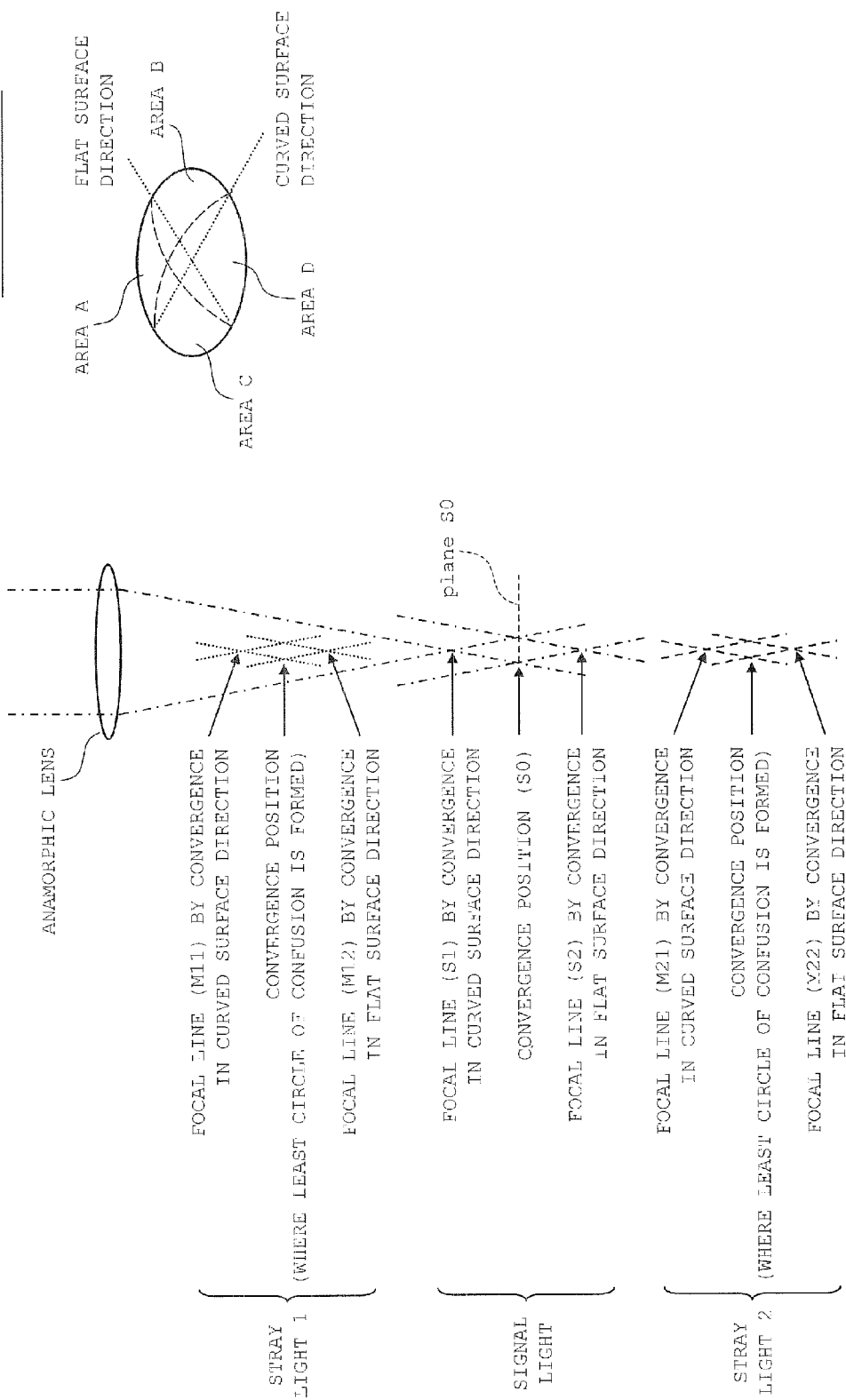

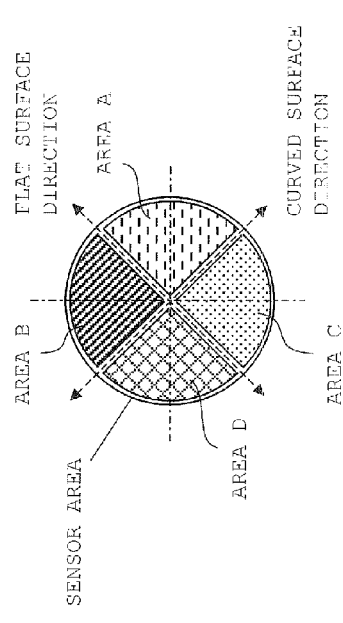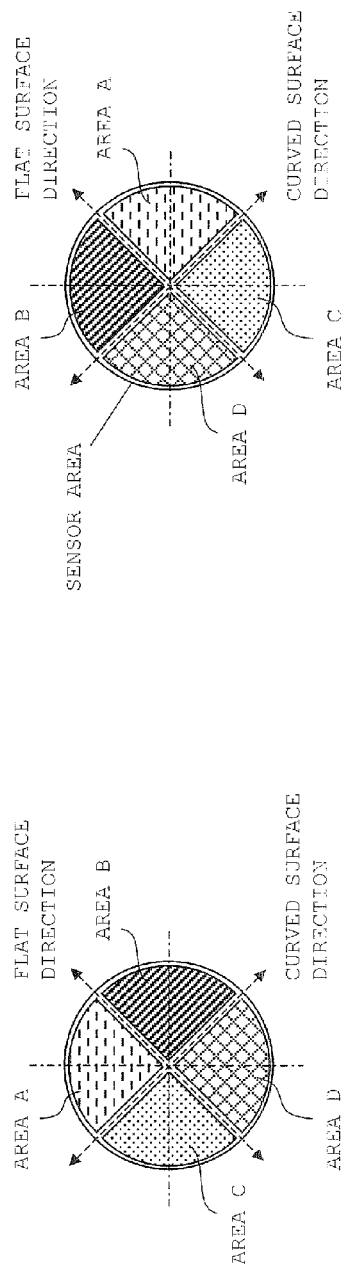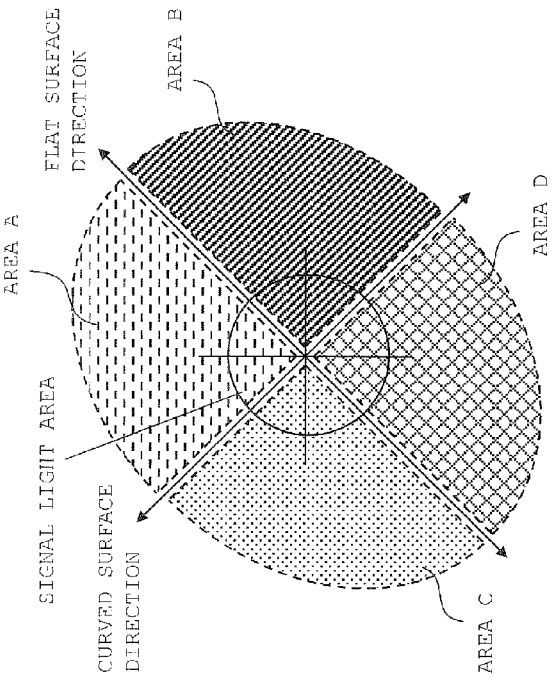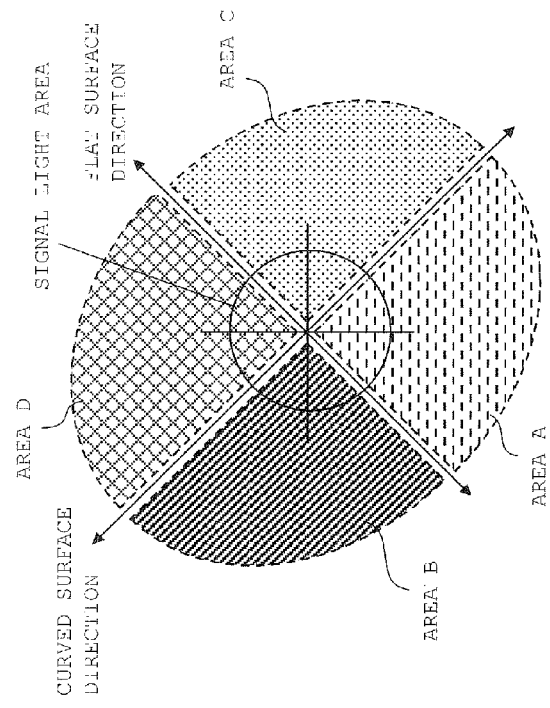
FIG.2A LIGHT FLUX DIVIDING PATTERN
FIG.2B SIGNAL LIGHT
FIG.2C STRAY LIGHT 1
FIG.2D STRAY LIGHT 2

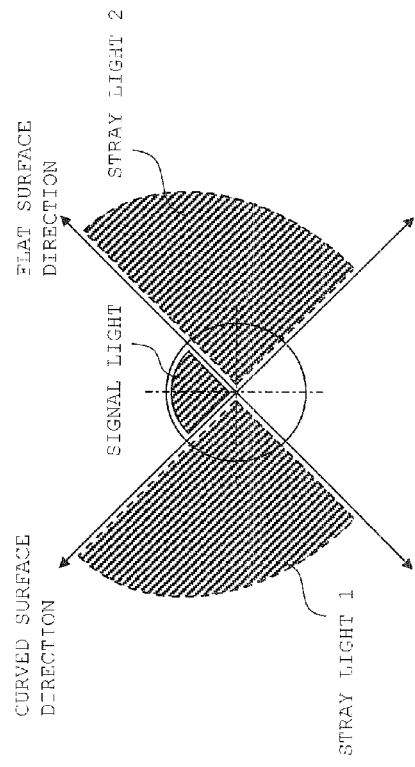
FIG. 3A LIGHT FLUX STATE IN AREA A
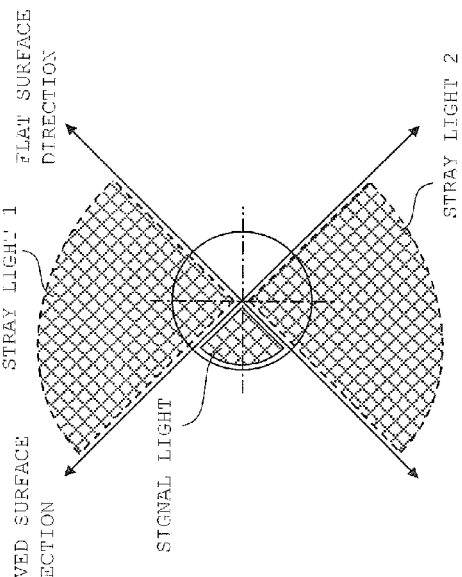
FIG. 3B LIGHT FLUX STATE IN AREA B
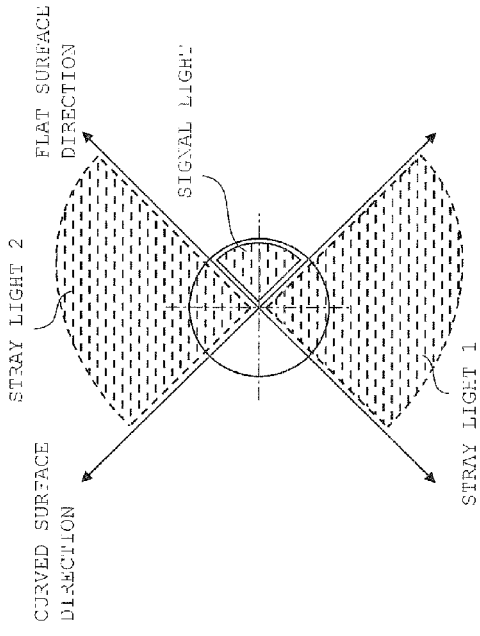
FIG. 3C LIGHT FLUX STATE IN AREA C
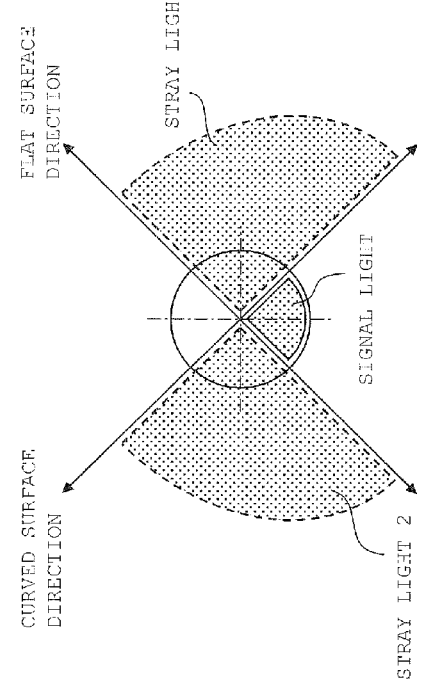
FIG. 3D LIGHT FLUX STATE IN AREA D

LIGHT FLUX ON PLANE S0

PROVIDE ANGULAR CHANGE TO EACH AREA

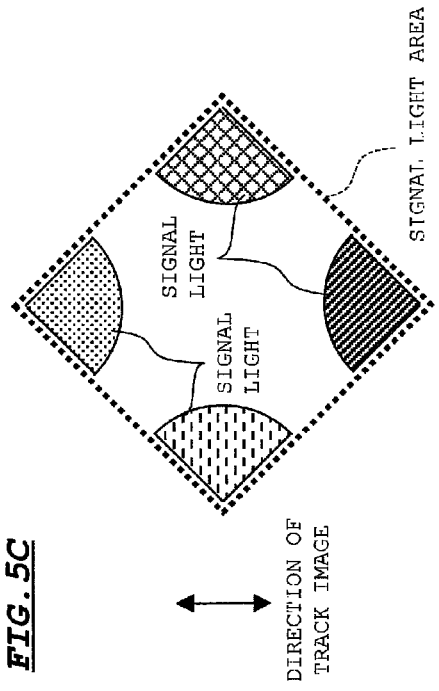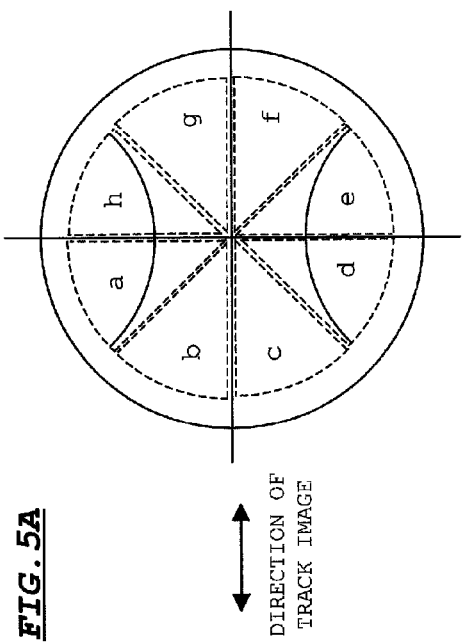

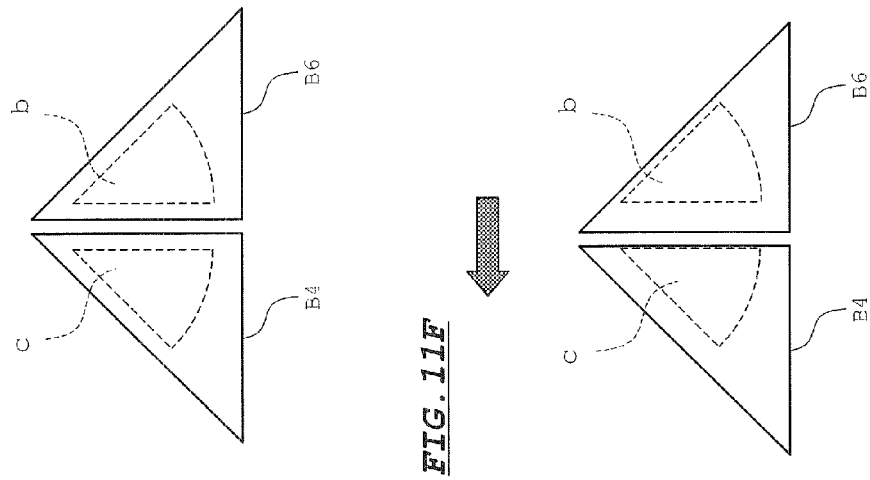
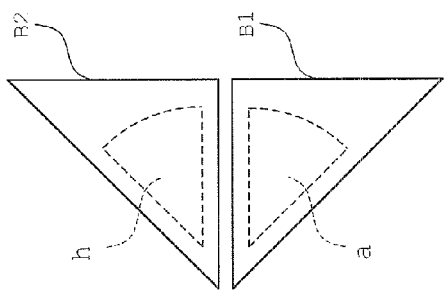
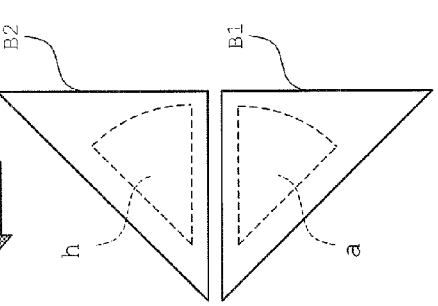
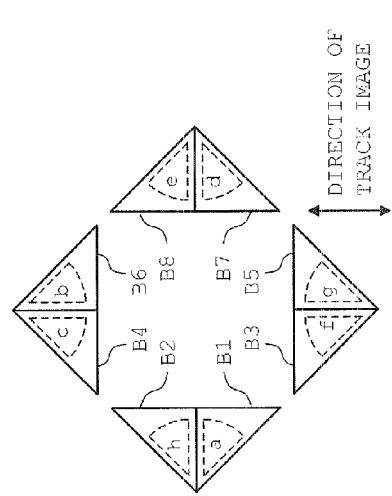
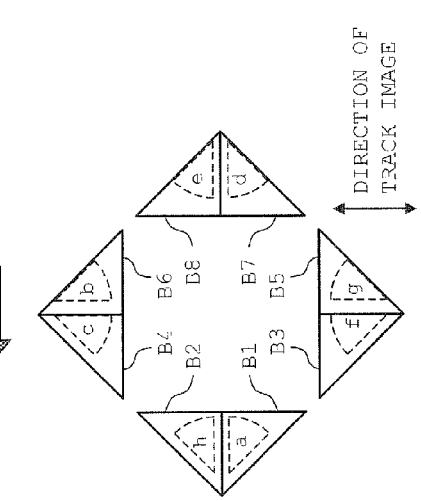

OPTICAL PICKUP DEVICE

This application claims priority under 35 U.S.C. Section 119 of Japanese Patent Application No. 2010-217978 filed Sep. 28, 2010, entitled "OPTICAL PICKUP DEVICE". The disclosure of the above application is incorporated herein by reference.

BACKGROUND OF THE INVENTION

1. Technical Field of the Invention

The invention relates to an optical pickup device, and more particularly to a device suitable for use in irradiating a recording medium having plural laminated recording layers with laser light.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

Japanese Unexamined Patent Publication No. 2009-211770 (corresponding to U.S. Patent Application Publication No. US2009/0225645 A1) discloses a novel arrangement of an optical pickup device operable to properly remove stray light, in the case where a large number of recording layers are formed. With this arrangement, it is possible to form an area where only signal light exists, on a light receiving surface of a photodetector. By disposing a sensor of the photodetector in the above area, it is possible to suppress an influence on a detection signal resulting from stray light.

In the above optical pickup device, if the position of the sensor disposed on the photodetector is displaced, a detection signal may be degraded depending on positional displacement amount.

SUMMARY OF THE INVENTION

A main aspect of the invention relates to an optical pickup device. The optical pickup device according to the main aspect includes a laser light source; an objective lens which focuses laser light emitted from the laser light source on a recording medium; an astigmatism element which converges the laser light in a first direction to generate a first focal line, and which converges the laser light in a second direction perpendicular to the first direction to generate a second focal line; a spectral element which makes propagating directions of light fluxes, in four different light flux areas, of the laser light reflected on the recording medium, different from each other to disperse the light fluxes in the four light flux areas from each other; and a photodetector which receives the dispersed light fluxes to output a detection signal. The spectral element sets the four light flux areas in such a manner that, assuming that an intersection of first and second straight lines respectively in parallel to the first direction and the second direction and perpendicularly intersecting with each other is aligned with an optical axis of the laser light, two of the light flux areas are disposed in a direction along which a pair of vertically opposite angles defined by the first and second straight lines are aligned, and that the other two of the light flux areas are disposed in a direction along which the other pair of vertically opposite angles defined by the first and second straight lines are aligned. The spectral element further sets propagating directions of divided elements of each of the light fluxes so as to disperse the divided elements on the photodetector, the divided elements being obtained by dividing each of the light fluxes into two parts by a third straight line intersecting with the first and second straight lines at an angle of 45 degrees, or by a fourth straight line orthogonal to the third straight line. The photodetector is provided with sensors which individually receive the divided elements of each of the light fluxes.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams for describing a technical principle (as to how light rays converge) in an embodiment of the invention.

FIGS. 2A through 2D are diagrams for describing the technical principle (as to how light fluxes are distributed) in the embodiment.

FIGS. 3A through 3D are diagrams for describing the technical principle (as to how signal light and stray light are distributed) in the embodiment.

FIGS. 5A through 5D are diagrams for describing a method for arranging sensors in the embodiment.

FIGS. 7A through 7F are diagrams for describing an output signal from each sensor resulting from positional displacement of a sensor, in the case where the spectral element based on the technical principle of the embodiment is used.

FIGS. 11A through 11F are diagrams for describing an output signal from each sensor resulting from positional displacement of sensors in the inventive example.

Figure 4B:
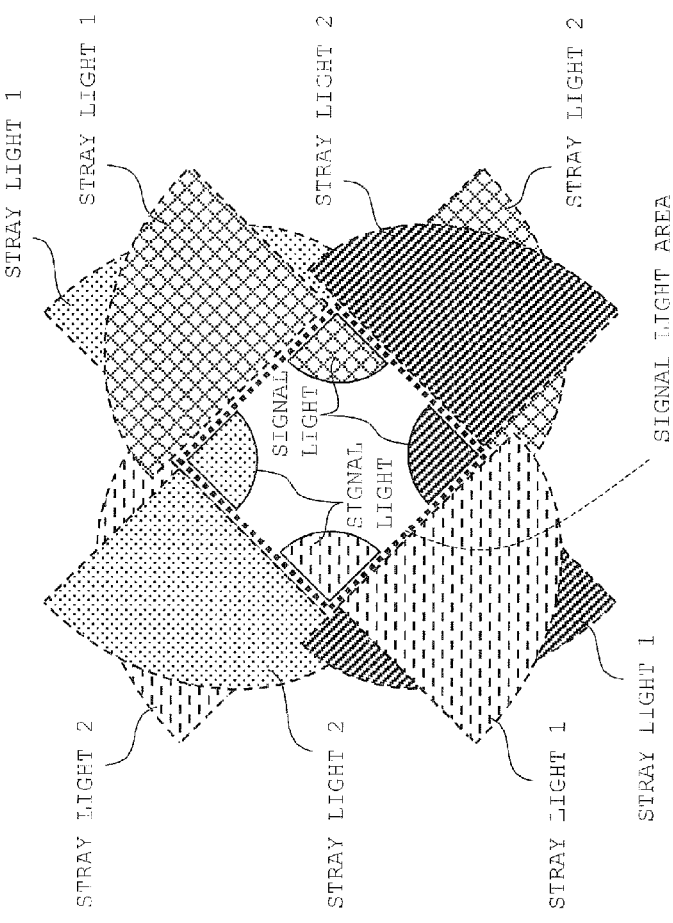
FIGS. 4A and 4B are diagrams for describing the technical principle (a method for separating light fluxes) in the embodiment.

The drawings are provided mainly for describing the present invention, and do not limit the scope of the present invention.

DESCRIPTION OF PREFERRED EMBODIMENTS

In the following, an embodiment of the invention is described referring to the drawings.

<Technical Principle>

First, a technical principle to which the embodiment of the invention is applied is described referring to FIGS. 1A through 6.

FIG. 1A is a diagram showing a state as to how light rays are converged. FIG. 1A is a diagram showing a state as to how laser light (signal light) reflected on a target recording layer, laser light (stray light 1) reflected on a layer located at a rearward position with respect to the target recording layer, and laser light (stray light 2) reflected on a layer located at a forward position with respect to the target recording layer are converged. FIG. 1B is a diagram showing an arrangement of an anamorphic lens to be used in the technical principle.

Referring to FIG. 1B, the anamorphic lens has a function of converging laser light to be entered in a direction in parallel to the lens optical axis, in a curved surface direction and a flat surface direction. The curved surface direction and the flat surface direction intersect perpendicularly to each other. Further, the curved surface direction has a smaller radius of curvature than that of the flat surface direction, and has a greater effect of converging laser light to be entered into the anamorphic lens.

To simplify the description on the astigmatism function of the anamorphic lens, the terms "curved surface direction" and "flat surface direction" are used. Actually, however, as far as the anamorphic lens has a function of forming focal lines at different positions from each other, the shape of the anamorphic lens in the "flat surface direction" in FIG. 1B is not limited to a flat plane shape. In the case where laser light is entered into the anamorphic lens in a convergence state, the shape of the anamorphic lens in the "flat surface direction" maybe a straight line shape (where the radius of curvature=∞).

Referring to FIG. 1A, signal light converged by the anamorphic lens forms focal lines at different positions from each other by convergence in the curved surface direction and in the flat surface direction. The focal line position (S1) of signal light by convergence in the curved surface direction is close to the anamorphic lens than the focal line position (S2) of signal light by convergence in the flat surface direction, and the convergence position (S0) of signal light is an intermediate position between the focal line positions (S1) and (S2) by convergence in the curved surface direction and in the flat surface direction.

Similarly to the above, the focal line position (M11) of stray light 1 converged by the anamorphic lens by convergence in the curved surface direction is close to the anamorphic lens than the focal line position (M12) of stray light 1 by convergence in the flat surface direction. The anamorphic lens is designed to make the focal line position (M12) of stray light 1 by convergence in the flat surface direction close to the anamorphic lens than the focal line position (S1) of signal light by convergence in the curved surface direction.

Similarly to the above, the focal line position (M21) of stray light 2 converged by the anamorphic lens in the curved surface direction is close to the anamorphic lens than the focal line position (M22) of stray light 2 by convergence in the flat surface direction. The anamorphic lens is designed to make the focal line position (M21) of stray light 2 by convergence in the curved surface direction away from the anamorphic lens than the focal line position (S2) of signal light by convergence in the flat surface direction.

Further, the beam spot of signal light has a shape of a least circle of confusion on the convergence position (S0) between the focal line position (S1) and the focal line position (S2).

Taking into account the above matters, the following is a description about a relationship between irradiation areas of signal light and stray light 1, 2 on the plane S0.

As shown in FIG. 2A, the anamorphic lens is divided into four areas A through D. In this case, signal light entered into the areas A through D is distributed on the plane S0, as shown in FIG. 2B. Further, stray light 1 entered into the areas A through D is distributed on the plane S0, as shown in FIG. 2C, and stray light 2 entered into the areas A through D is distributed on the plane S0, as shown in FIG. 2D.

If signal light and stray light 1, 2 on the plane S0 are extracted in each of light flux areas, the distributions of the respective light are as shown in FIGS. 3A through 3D. In this case, stray light 1 and stray light 2 in the same light flux area are not overlapped with signal light in each of the light flux areas. Accordingly, if the device is configured such that only signal light is received by a sensor after light fluxes (signal light, stray light 1, 2) in each of the light flux areas are separated in different directions, only signal light is entered into a corresponding sensor to thereby suppress incidence of stray light. Thus, it is possible to avoid degradation of a detection signal resulting from stray light.

As described above, it is possible to extract only signal light by dispersing and separating light passing through the areas A through D from each other on the plane S0. The embodiment is made based on the above technical principle.

Figure 4A:
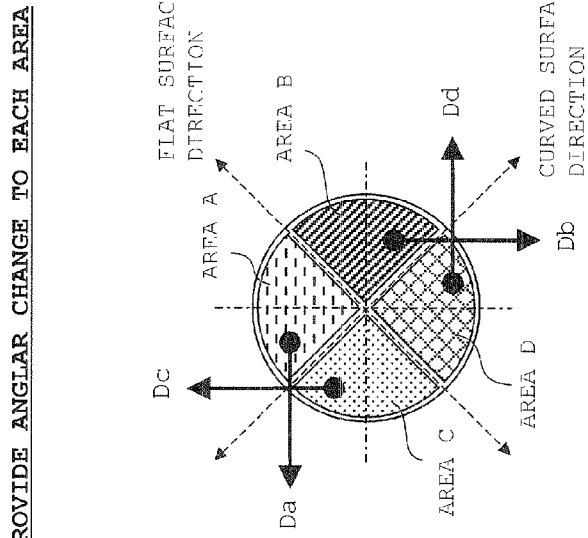

FIGS. 4A and 4B are diagrams showing a distribution state of signal light and stray light 1, 2 on the plane S0, in the case where the propagating directions of light fluxes (signal light, stray light 1, 2) passing through the four areas A through D shown in FIG. 2A are respectively changed in different directions by the same angle. FIG. 4A is a diagram of the anamorphic lens when viewed from the optical axis direction of the anamorphic lens (the propagating direction along which laser light is entered into the anamorphic lens), and FIG. 4B is a diagram showing a distribution state of signal light, stray light 1, 2 on the plane S0.

In FIG. 4A, the propagating directions of light fluxes (signal light, stray light 1, 2) that have passed through the areas A through D are respectively changed into directions Da, Db, Dc, Dd by the same angle amount a (not shown) with respect to the propagating directions of the respective light fluxes before incidence. The directions Da, Db, Dc, Dd each has an inclination of 45° with respect to the flat surface direction and the curved surface direction.

In this case, as shown in FIG. 4B, it is possible to distribute signal light and stray light 1, 2 in each of the light flux areas, on the plane S0, by adjusting the angle amount a with respect to the directions Da, Db, Dc, Dd. As a result of the above operation, as shown in FIG. 4B, it is possible to form a signal light area where only signal light exists on the plane S0. By disposing sensors of a photodetector in the signal light area, it is possible to receive only signal light in each of the light flux areas by a corresponding sensor. FIGS. 5A through 5D are diagrams showing a method for arranging sensors. FIG. 5A is a diagram showing light flux areas of reflected light (signal light) on a disc, and FIG. 5B is a diagram showing a distribution state of signal light on a photodetector, in the case where an anamorphic lens and a photodetector (a four-divided sensor) based on a conventional astigmatism method are respectively disposed on the arranged position of the anamorphic lens and on the plane S0, in the arrangement shown in FIG. 1A. FIGS. 5C and 5D are diagrams showing a distribution state of signal light and a sensor layout based on the above principle, on the plane S0.

The direction of a diffraction image (a track image) of signal light resulting from a track groove has an inclination of 45° with respect to the flat surface direction and the curved surface direction. In FIG. 5A, assuming that the direction of a track image is aligned with leftward and rightward directions, in FIGS. 5B through 5D, the direction of a track image by signal light is aligned in upward and downward directions. In FIGS. 5A, 5B, and 5D, to simplify the description, a light flux is divided into eight light flux areas a through h. Further, the track image is shown by the solid line, and the beam shape in an out-of-focus state is shown by the dotted line.

It is known that an overlapped state of a zero-th order diffraction image and a first-order diffraction image of signal light resulting from a track groove is obtained by an equation: wavelength/(track pitch×objective lens NA). As shown in FIGS. 5A, 5B, 5D, a requirement that a first-order diffraction image is formed in the four light flux areas a, b, e, h is expressed by: wavelength track pitch×objective lens NA>√2.

In the conventional astigmatism method, sensors P1 through P4 (a four-divided sensor) of a photodetector are arranged as shown in FIG. 5B. In this case, assuming that detection signal components based on light intensities in the light flux areas a through h are expressed by A through H, a focus error signal FE and a push-pull signal PP are obtained by the following equations (1) and (2).

$$FE=(A+B+E+F)-(C+D+G+H) \quad (1)$$

$$PP=(A+B+G+H)-(C+D+E+F) \quad (2)$$

On the other hand, as described above, signal light is distributed in the signal light area as shown in FIG. 5C in the distribution state shown in FIG. 4B. In this case, signal light passing through the light flux areas a through h shown in FIG. 5A is distributed as shown in FIG. 5D. Specifically, signal light passing through the light flux areas a through h in FIG. 5A are guided to the light flux areas a through h shown in FIG. 5D, on the plane S0 where the sensors of the photodetector are disposed.

Accordingly, by disposing the sensors P11 through P18 at the positions of the light flux areas a through h shown in FIG. 5D in an overlapped state as shown in FIG. 5D, it is possible to generate a focus error signal and a push-pull signal by performing the same computation as applied to the process described in the case of FIG. 5B. Specifically, assuming that A through H represent detection signals from the sensors for receiving light fluxes in the light flux areas a through h, a focus error signal FE and a push-pull signal PP can be acquired by the above equations (1) and (2) in the same manner as described in the case of FIG. 5B.

As described above, according to the above principle, it is possible to generate a focus error signal and a push-pull signal (a tracking error signal) with no or less influence of stray light by performing the same computation as applied to the process based on the conventional astigmatism method.

Figure 6:
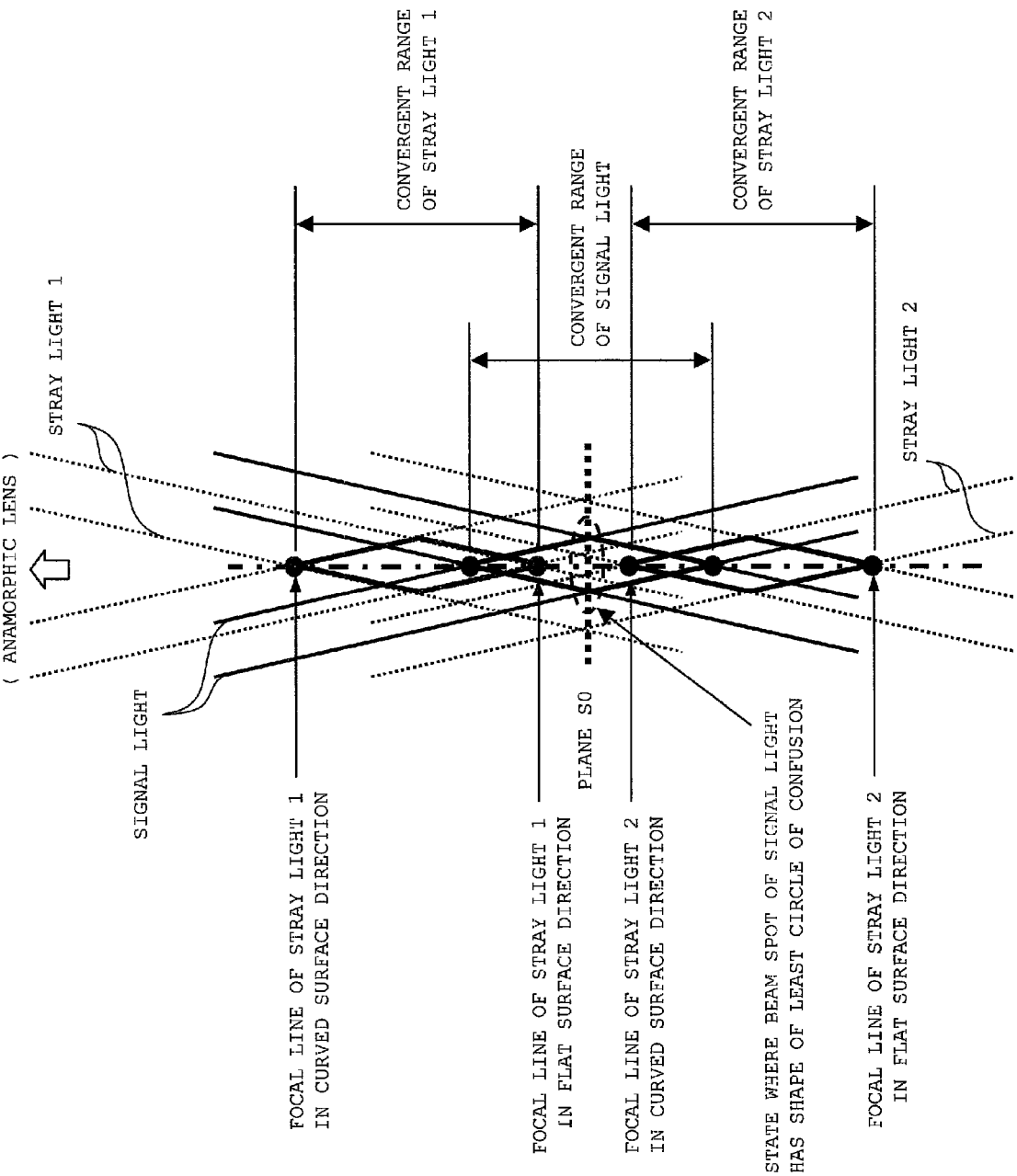
FIG. 6 is a diagram showing a preferable range to which the technical principle of the embodiment is applied.

The effect by the above principle is obtained, as shown in FIG. 6, in the case where the focal line position of stray light 1 in the flat surface direction is close to the anamorphic lens with respect to the plane S0 (a plane where the beam spot of signal light has a shape of a least circle of confusion), and the focal line position of stray light 2 in the curved surface direction is away from the anamorphic lens with respect to the plane S0. Specifically, as far as the above relationship is satisfied, the distribution state of signal light, and stray light 1, 2 is as shown in FIG. 4B, which makes it possible to keep signal light, and stray light 1, 2 from overlapping each other on the plane S0. In other words, as far as the above relationship is satisfied, the advantage based on the above principle is obtained, even if the focal line position of stray light 1 in the flat surface direction comes closer to the plane S0 than the focal line position of signal light in the curved surface direction, or even if the focal line position of stray light 2 in the curved surface direction comes closer to the plane S0 than the focal line position of signal light in the flat surface direction.

In the following, an output signal from each sensor resulting from positional displacement of the sensors P11 through P18 is described, in case where signal light passing through the eight light flux areas a through h shown in FIG. 5A is distributed on the sensor layout shown in FIG. 5D, based on the above principle.

Figure 7C:
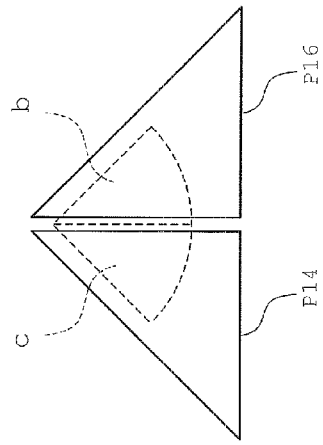
Figure 7B:
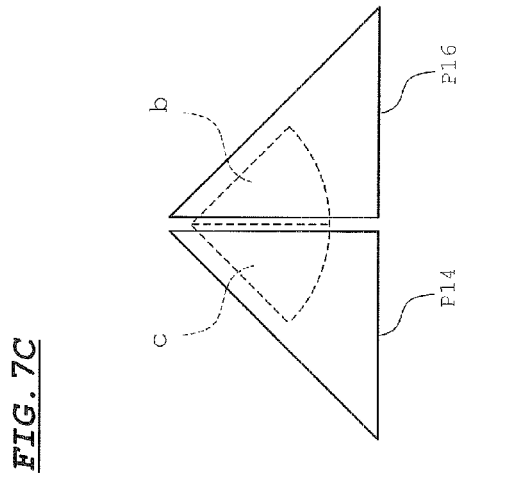
Figure 7A:
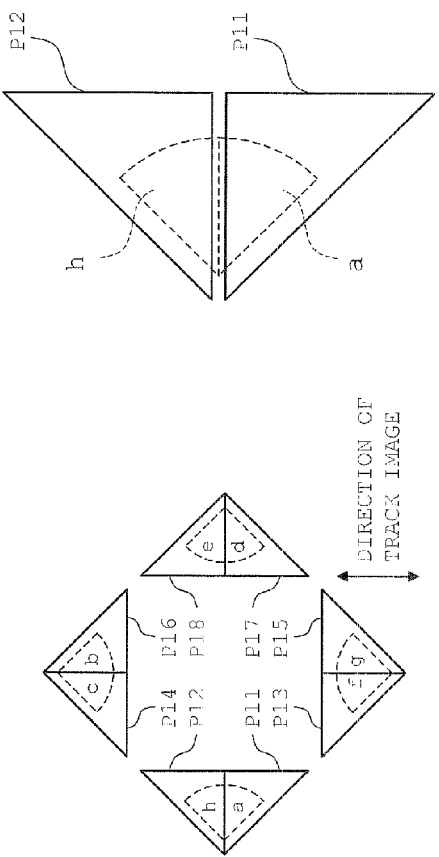

FIG. 7A is a diagram showing an irradiation area of signal light passing through the light flux areas a through h, in the case where the positions of the sensors P11 through P18 are not displaced. To simplify the description, the irradiation areas of laser light passing through the light flux areas a through h on the plane S0 are expressed as irradiation areas a through h. FIG. 7A shows a state that the focus position of laser light is adjusted on a target recording layer. In this state, as shown in FIG. 7A, signal light passing through the light flux areas a through h is uniformly irradiated onto the each sensor.

FIGS. 7B, 7C are enlarged views showing an irradiation area near the sensors P11, P12, and an irradiation area near the sensors P14, P16 in the state shown in FIG. 7A. As shown in FIGS. 7B, 7C, a slight clearance is formed between the sensors P11, P12, and between the sensors P14, P16. Likewise, a slight clearance is formed between the sensors P13, P15, and between the sensors P17, P18.

As shown in FIG. 7B, although an upper end of the irradiation area a and a lower end of the irradiation area h are respectively deviated from the sensors P11, P12, the irradiation areas a, h respectively and uniformly overlap the sensors P11, P12. As shown in FIG. 7C, although a left end of the irradiation area b and a right end of the irradiation area c are respectively deviated from the sensors P16, P14, the irradiation areas b, c respectively and uniformly overlap the sensors P16, P14. Likewise, the irradiation areas f, g respectively and uniformly overlap the sensors P13, P15, and the irradiation areas d, e respectively and uniformly overlap the sensors P17, P18.

Figure 7E:
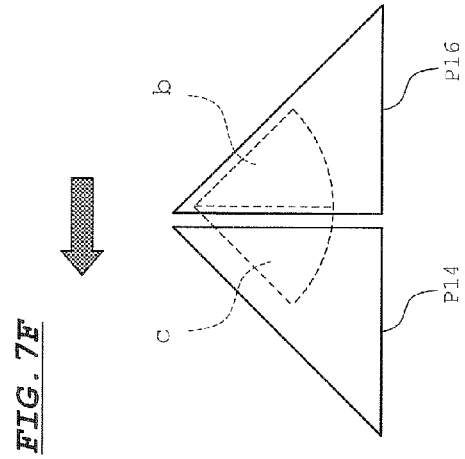
Figure 7E:
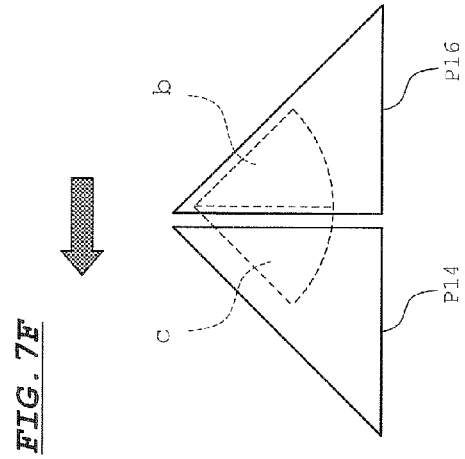
Figure 7D:
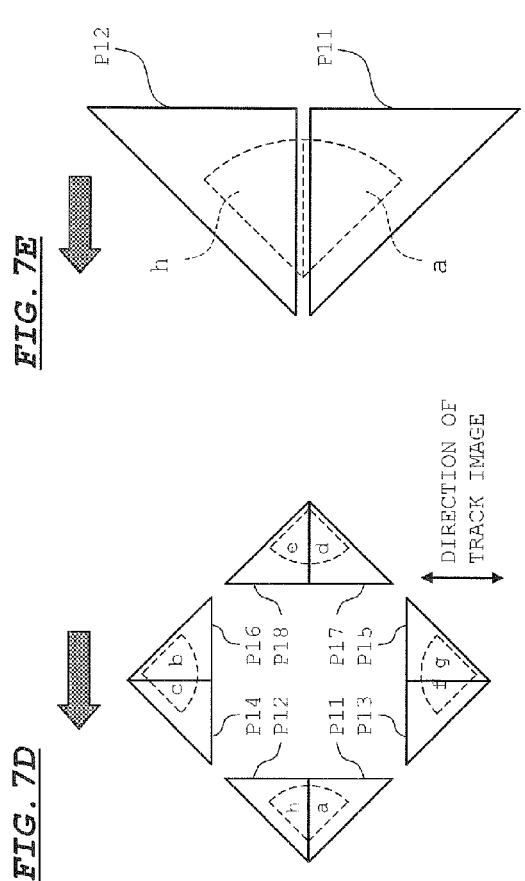

FIG. 7D is a diagram showing irradiation areas of signal light passing through the light flux areas a through h, in the case where the positions of the sensors P11 through P18 are displaced from the state shown in FIG. 7A in a direction (leftward or rightward direction) perpendicular to the direction of a track image. As shown in FIG. 7D, although the irradiation areas are the same as those in the state shown in FIG. 7A, since the positions of the sensors P11 through P18 are displaced leftward, the irradiation areas in the state shown in FIG. 7D are displaced rightward within the sensors P11 through P18.

FIG. 7E is an enlarged view showing irradiation areas near the sensors P11, P12 in the state shown in FIG. 7D. As shown in FIG. 7E, the irradiation areas a, h respectively and uniformly overlap the sensors P11, P12 in the same manner as the state shown in FIG. 7B, although the irradiation areas a, h are respectively displaced rightward from the sensors P11, P12. Accordingly, the output signals from the sensors P11, P12 in the state shown in FIG. 7E are substantially the same as the output signals from the sensors P11, P12 in the state shown in FIG. 7A. Likewise, the output signals from the sensors P17, P18 in the state shown in FIG. 7E are substantially the same as the output signals from the sensors P17, P18 in the state shown in FIG. 7A.

FIG. 7F is an enlarged view showing irradiation areas near the sensors P14, P16 in the state shown in FIG. 7D. As shown in FIG. 7F, although a right end of the irradiation area b lies within the sensor P16, a left end of the irradiation area b overlaps the sensor P16, unlike the state shown in FIG. 7C. Further, although a left end of the irradiation area c lies within the sensor P14, a right end of the irradiation area c is deviated rightward from the sensor P14 and overlaps the sensor P16, unlike the state shown in FIG. 7C. As a result, the output signal from the sensor P16 is increased, and the output signal from the sensor P14 is decreased, as compared with the state shown in FIG. 7A. Likewise, the output signal from the sensor P15 is increased, and the output signal from the sensor P13 is decreased, as compared with the state shown in FIG. 7A.

Further, in the case where the positions of the sensors P11 through P18 are displaced rightward substantially by the same displacement amount as the state shown in FIG. 7D, the output signals from the sensors P11, P12, P17, P18 are kept substantially unchanged, the output signals from the sensors P13, P14 are increased, and the output signals from the sensors P15, P16 are decreased, as compared with the state shown in FIG. 7A. Further, in the case where the positions of the sensors P11 through P18 are displaced in a direction (upward or downward direction) in parallel to the direction of a track image substantially by the same displacement amount as the state shown in FIG. 7D, the output signals from the sensors P13 through P16 are kept substantially unchanged, and the output signals from the sensors P11, P12, P17, P18 are changed.

In the above arrangement, it is preferable to keep the output signals from the sensors P11 through P18 unchanged, even if the positions of the sensors P11 through P18 are displaced. However, as described above, if the positions of the sensors P11 through P18 are displaced resulting from e.g. aging deterioration, the output signals from the sensors P11 through P18 are changed depending on a direction of the positional displacement and an amount of the positional displacement. As a result, the precision of output signals from the sensors P11 through P18 may be lowered.

In the following example, there are described a concrete construction example of an optical pickup device, and a spectral element capable of suppressing the above drawback.

EXAMPLE

The inventive example is an example, wherein the invention is applied to an optical pickup device compatible with BD, DVD and CD. The above principle is applied only to an optical system for BD, and a focus adjusting technology by a conventional astigmatism method and a tracking adjusting technology by a 3-beam system (an in-line system) are applied to an optical system for CD and an optical system for DVD.

Figure 8B:
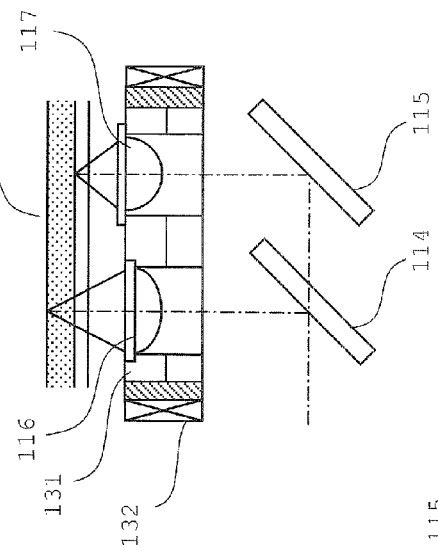
FIGS. 8A through 8C are diagrams showing an optical system of an optical pickup device in an inventive example.
Figure 8C:
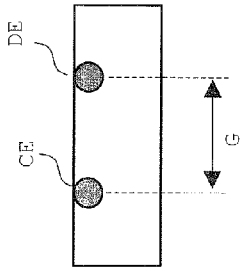
Figure 8A:
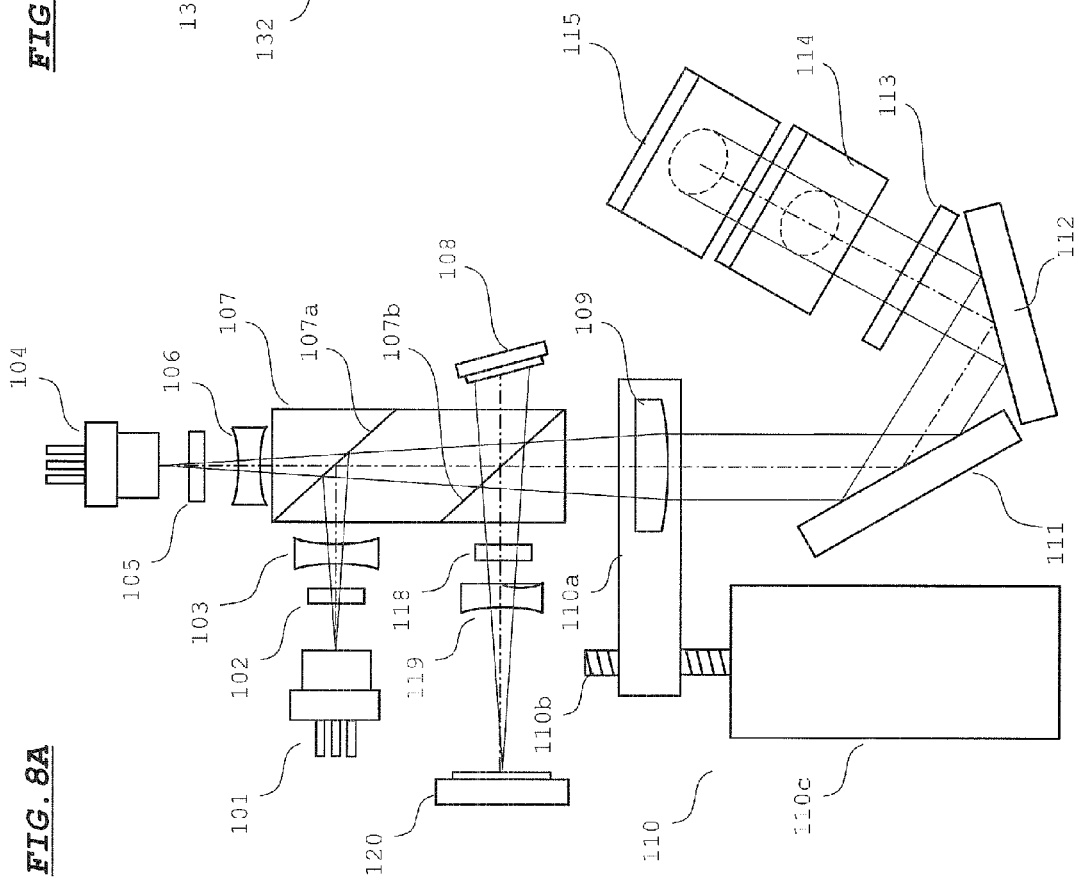

FIGS. 8A and 8B are diagrams showing an optical system of an optical pickup device in the inventive example. FIG. 8A is a plan view of the optical system showing a state that elements of the optical system on the disc side with respect to rise-up mirrors 114, 115 are omitted, and FIG. 8B is a perspective side view of the optical system posterior to the rise-up mirrors 114, 115.

As shown in FIG. 8A, the optical pickup device is provided with a semiconductor laser 101, a half wave plate 102, a diverging lens 103, a dual wavelength laser 104, a diffraction grating 105, a diverging lens 106, a complex prism 107, a front monitor 108, a collimator lens 109, a driving mechanism 110, reflection mirrors 111, 112, a quarter wave plate 113, the rise-up mirrors 114, 115, a dual wavelength objective lens 116, a BD objective lens 117, a spectral element 118, an anamorphic lens 119, and a photodetector 120.

The semiconductor laser 101 emits laser light (hereinafter, called as "BD light") for BD and having a wavelength of or about 405 nm. The half wave plate 102 adjusts the polarization direction of BD light. The diverging lens 103 adjusts the focal length of BD light to shorten the distance between the semiconductor laser 101 and the complex prism 107.

The dual wavelength laser 104 accommodates, in a certain CAN, two laser elements which each emit laser light (hereinafter, called as "CD light") for CD and having a wavelength of or about 785 nm, and laser light (hereinafter, called as "DVD light") for DVD and having a wavelength of or about 660 nm.

FIG. 8C is a diagram showing an arrangement pattern of laser elements (laser light sources) in the dual wavelength laser 104. FIG. 8C is a diagram of the dual wavelength laser 104 when viewed from the beam emission side. In FIG. 8C, CE and DE respectively indicate emission points of CD light and DVD light. The gap between the emission points of CD light and DVD light is represented by the symbol G.

As will be described later, the gap G between the emission point CE of CD light and the emission point DE of DVD light is set to such a value as to properly irradiate DVD light onto a four-divided sensor for DVD light. Accommodating two light sources in one CAN as described above enables to simplify the optical system, as compared with an arrangement provided with plural CANs.

Referring back to FIG. 8A, the diffraction grating 105 separates each of CD light and DVD light into a main beam and two sub beams. The diffraction grating 105 is a two-step diffraction grating. Further, the diffraction grating 105 is integrally formed with a half wave plate. The half wave plate integrally formed with the diffraction grating 105 adjusts the polarization directions of CD light and DVD light. The diverging prism 106 adjusts the focal lengths of CD light and DVD light to shorten the distance between the dual wavelength laser 104 and the complex prism 107.

The complex prism 107 is internally formed with a dichroic surface 107a, andaPolarizingBeamSplitter (PBS) surface 107b. The dichroic surface 107a reflects BD light, and transmits CD light and DVD light. The semiconductor laser 101, the dual wavelength laser 104 and the complex prism 107 are disposed at such positions that the optical axis of BD light reflected on the dichroic surface 107a and the optical axis of CD light transmitted through the dichroic surface 107a are aligned with each other. The optical axis of DVD light transmitted through the dichroic surface 107a is displaced from the optical axes of BD light and CD light by the gap G shown in FIG. 8C.

A part of each of BD light, CD light and DVD light is reflected on the PBS surface 107b, and a main part thereof is transmitted through the PBS surface 107b. As described above, the half wave plate 102, and the diffraction grating 105 (and the half wave plate integrally formed with the diffraction grating 105) are disposed at such positions that a part of each of BD light, CD light and DVD light is reflected on the PBS surface 107b.

When the diffraction grating 105 is disposed at the position as described above, a main beam and two sub beams of CD light, and a main beam and two sub beams of DVD light are respectively aligned along the tracks of CD and DVD. The main beam and the two sub beams reflected on CD are irradiated onto four-divided sensors for CD on the photodetector 120, which will be described later. The main beam and two sub beams reflected on DVD are irradiated onto four-divided sensors for DVD on the photodetector 120, which will be described later.

BD light, CD light, DVD light reflected on the PBS surface 107b is irradiated onto the front monitor 108. The front monitor 108 outputs a signal in accordance with a received light amount. The signal from the front monitor 108 is used for emission power control of the semiconductor laser 101 and the dual wavelength laser 104.

The collimator lens 109 converts BD light, CD light and DVD light entered from the side of the complex prism 107 into parallel light. The driving mechanism 110 moves the collimator lens 109 in the optical axis direction in accordance with a control signal for aberration correction. The driving mechanism 110 is provided with a holder 110a for holding the collimator lens 109, and a gear 110b for feeding the holder 110a in the optical axis direction of the collimator lens 109. The gear 110b is interconnected to a driving shaft of a motor 110c.

BD light, CD light and DVD light collimated by the collimator lens 109 are reflected on the two reflection mirrors 111, 112, and are entered into the quarter wave plate 113. The quarter wave plate 113 converts BD light, CD light and DVD light entered from the side of the reflection mirror 112 into circularly polarized light, and converts BD light, CD light and DVD light entered from the side of the rise-up mirror 114 into a linearly polarized light whose polarization direction is orthogonal to the polarization direction upon incidence from the side of the reflection mirror 112. With this operation, light reflected on a disc is reflected on the PBS surface 107b.

The rise-up mirror 114 is a dichroic mirror. The rise-up mirror 114 transmits BD light, and reflects CD light and DVD light in a direction toward the dual wavelength objective lens 116. The rise-up mirror 115 reflects BD light in a direction toward the BD objective lens 117.

The dual wavelength objective lens 116 is configured to properly focus CD light and DVD light on CD and DVD, respectively. Further, the BD objective lens 117 is configured to properly focus BD light on BD. The dual wavelength objective lens 116 and the BD objective lens 117 are driven by an objective lens actuator 132 in a focus direction and in a tracking direction, while being held on the holder 110a.

The spectral element 118 has a stepped diffraction pattern (a diffraction hologram) on an incident surface thereof. Out of BD light, CD light and DVD light entered into the spectral element 118, BD light is divided into twelve light fluxes, which will be described later, and the propagating direction of each of the light fluxes is changed by diffraction on the spectral element 118. Main parts of CD light and DVD light are transmitted through the spectral element 118 without diffraction on the spectral element 118. An arrangement of the spectral element 118 will be described later referring to FIG. 9A.

The anamorphic lens 119 imparts astigmatism to BD light, CD light and DVD light entered from the side of the spectral element 118. The anamorphic lens 119 corresponds to the anamorphic lens shown in FIG. 1A, 1B. BD light, CD light and DVD light transmitted through the anamorphic lens 119 are entered into the photodetector 120. The photodetector 120 has a sensor layout for receiving the respective light. The sensor layout of the photodetector 120 will be described later referring to FIG. 9B.

Figure 9A:
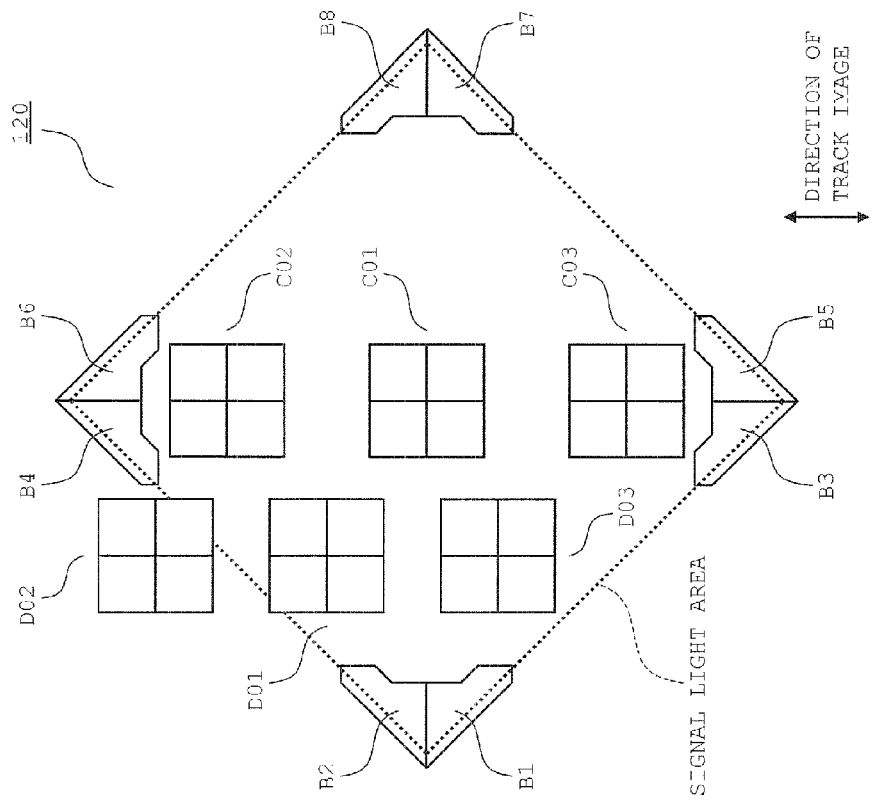
FIGS. 9A and 9B are diagrams showing an arrangement of a spectral element and a sensor layout of a photodetector in the inventive example.

FIG. 9A is a diagram showing an arrangement of the spectral element 118. FIG. 9A is a plan view of the spectral element 118, when viewed from the side of the complex prism 107. FIG. 9A also shows the flat surface direction, the curved surface direction of the anamorphic lens 119, and a direction of a track image of laser light to be entered into the spectral element 118.

The spectral element 118 is made of a square transparent plate, and has a stepped diffraction pattern (a diffraction hologram) on a light incident surface thereof. The step number and the step height of the diffraction pattern are set such that plus first order diffraction efficiency with respect to the wavelength of BD light is set high, and that zero-th order diffraction efficiency with respect to the wavelengths of CD light and DVD light is set high.

As shown in FIG. 9A, the light incident surface of the spectral element 118 is divided into eight diffraction areas 118a through 118h. The spectral element 118 is disposed at such a position that BD light is uniformly entered into each of the diffraction areas 118a through 118h. Specifically, the spectral element 118 is disposed at such a position that the center of the spectral element 118 shown in FIG. 9A is aligned with the optical axis of BD light, and light passing through the light flux areas a through h shown in FIG. 5A is respectively entered into the diffraction areas 118a through 118h.

The diffraction areas 118a through 118h respectively diffract the entered BD light in directions Va through Vh by plus first-order diffraction function. The directions Va, Vh are respectively and slightly displaced from the direction Da shown in FIG. 4A by a component in downward direction and by a component in upward direction as shown in FIG. 9A. The directions Vf, Vg are respectively and slightly displaced from the direction Db shown in FIG. 4A by a component in leftward direction and by a component in rightward direction as shown in FIG. 9A. The directions Vb, Vc are respectively and slightly displaced from the direction Dc shown in FIG. 4A by a component in rightward direction and by a component in leftward direction as shown in FIG. 9A. The directions Vd, Ve are respectively and slightly displaced from the direction Dd shown in FIG. 4A by a component in downward direction and by a component in upward direction as shown in FIG. 9A. Further, each of the diffraction areas 118a through 118h diffracts BD light by the same diffraction angle by plus first order diffraction function. The diffraction angle is adjusted by the pitch of a diffraction pattern.

The diffraction areas 118a through 118h are formed by e.g. a diffraction pattern having eight steps. In this case, the step difference per step is set to 7.35 μm. With this arrangement, it is possible to set the diffraction efficiencies of zero-th order diffraction light of CD light and DVD light to 99% and 92% respectively, while keeping the diffraction efficiency of plus first order diffraction light of BD light to 81%. In this case, zero-th order diffraction efficiency of BD light is set to 7%. CD light and DVD light are irradiated onto four-divided sensors on the photodetector 120, which will be described later, substantially without diffraction on the diffraction areas 118a through 118h.

Alternatively, it is possible to set the number of steps of a diffraction pattern to be formed in the diffraction areas 118a through 118h to the number other than eight. Furthermore, it is possible to configure the diffraction areas 118a through 118h by using e.g. the technology disclosed in Japanese Unexamined Patent Publication No. 2006-73042. Using the above technology enables to more finely adjust diffraction efficiencies of BD light, CD light and DVD light.

Figure 9B:
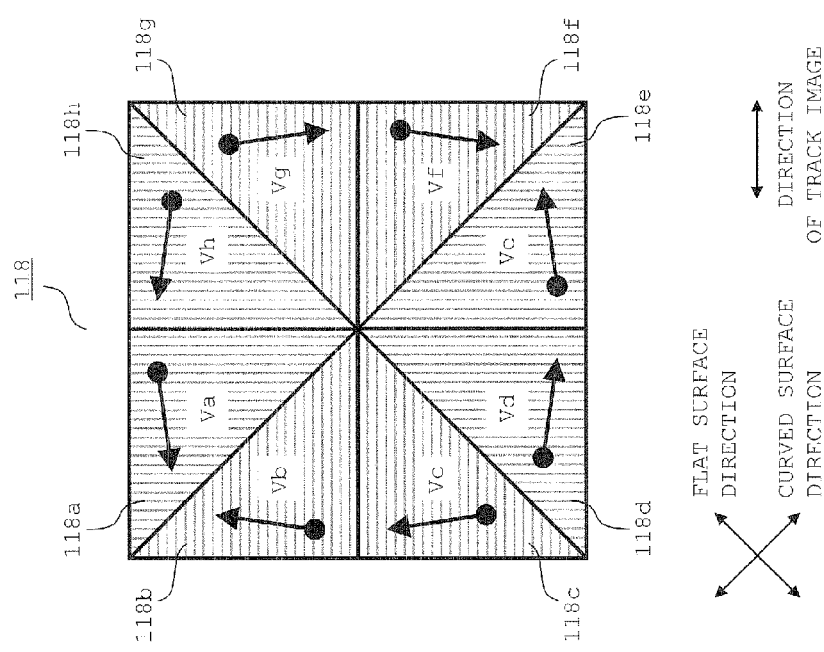

FIG. 9B is a diagram showing a sensor layout of the photodetector 120.

The photodetector 120 has sensors B1 through B8 for BD and for receiving BD light separated by the spectral element 118; four-divided sensors CO1 through CO3 for CD and for receiving CD light transmitted through the spectral element 118 without separation by the spectral element 118; and four-divided sensors DO1 through D03 for DVD and for receiving DVD light transmitted through the spectral element 118 without separation by the spectral element 118. Signal light of BD light separated by the spectral element 118 is respectively irradiated onto vertex portions of the signal light area.

As shown in FIG. 9B, the sensors B1, B2, the sensors B3, B5, the sensors B4, B6, the sensors B7, B8 are disposed near each of the four vertices of the signal light area so that signal light of BD light passing through the light flux areas a through h can be individually received. The sensors B1 through B8 are disposed at such positions that the irradiation area of BD light to be irradiated onto a position on the inside of the four vertex portions of the signal light area is sufficiently included. With this arrangement, even in the case where the positions of the sensors B1 through B8 are displaced resulting from e.g. aging deterioration, it is possible to sufficiently receive signal light separated by the spectral element 118 by the sensors B1 through B8. The irradiation area of signal light of BD light will be described later referring to FIG. 10A.

The optical axes of BD light and CD light are aligned with each other on the dichroic surface 107a as described above. Accordingly, a main beam (zero-th order diffraction light) of CD light is irradiated onto a center of the signal light area of BD light, on the light receiving surface of the photodetector 120. The four-divided sensor C01 is disposed at the center position of a main beam of CD light. The four-divided sensors C02, C03 are disposed in the direction of a track image with respect to a main beam of CD light, on the light receiving surface of the photodetector 120, to receive sub beams of CD light.

Since the optical axis of DVD light is displaced from the optical axis of CD light as described above, a main beam and two sub beams of DVD light are irradiated at positions displaced from the irradiation positions of a main beam and two sub beams of CD light, on the light receiving surface of the photodetector 120. The four-divided sensors D01 through D03 are respectively disposed at the irradiation positions of a main beam and two sub beams of DVD light. The distance between a main beam of CD light and a main beam of DVD light is determined by the gap G between emission points of CD light and DVD light shown in FIG. 8C.

Figure 10A:
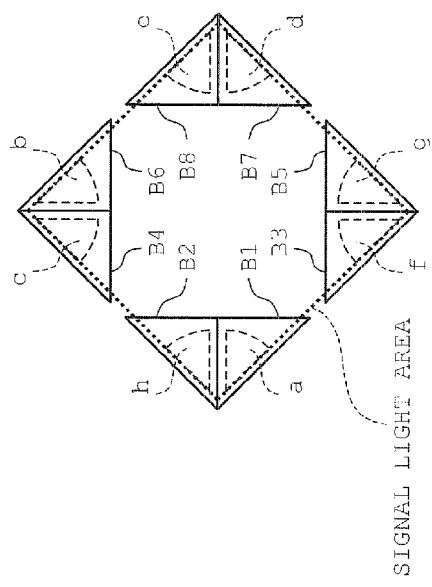
FIGS. 10A through 10C are schematic diagrams showing irradiation areas in the inventive example and in a modification example.

FIG. 10A is a schematic diagram showing an irradiation area, in the case where BD light passing through the light flux areas a through h is irradiated onto the sensors B1 through B8 shown in FIG. 9B. FIG. 10A shows signal light of BD light to be irradiated onto the sensors B1 through B8, in the case where the focus position of BD light is adjusted on a target recording layer. The irradiation areas of BD light passing through the light flux areas a through h, on the photodetector 120, are indicated as irradiation areas a through h to simplify the description. Further, to simplify the description, the shape of the sensors B1 through B8 shown in FIGS. 10A is simplified in comparison with the shape of the sensors B1 through B8 shown in FIG. 9B.

As shown in FIG. 10A, signal light of BD light passing through the light flux areas a through h is respectively irradiated onto the sensors B1, B6, B4, B7, B8, B3, B5, B2. In this arrangement, stray light 1, 2 of BD light passing through the light flux areas a through h is irradiated onto a position on the outside of the signal light area substantially in the same manner as the state shown in FIG. 4B.

Further, the irradiation area a and the irradiation area h are away from each other in upward and downward directions by a predetermined distance, with a boundary portion between the sensor B1 and the sensor B2 being formed therebetween. The irradiation area b and the irradiation area c are away from each other in leftward and rightward directions by a predetermined distance, with a boundary portion between the sensor B6 and the sensor B4 being formed therebetween. The irradiation area d and the irradiation area e are away from each other in upward and downward directions by a predetermined distance, with a boundary portion between the sensor B7 and the sensor B8 being formed therebetween. The irradiation area f and the irradiation area g are away from each other in leftward and rightward directions by a predetermined distance, with a boundary portion between the sensor B3 and the sensor B5 being formed therebetween. These distances are generated by the components in upward and downward directions with respect to the directions Va, Vh; the components in leftward and rightward directions with respect to the directions Vb, Vc; the components in upward and downward directions with respect to the directions Vd, Ve; and the components in leftward and rightward directions with respect to the directions Vf, Vg, which have been described above.

Next, an output signal from each sensor resulting from positional displacement of the sensors B1 through B8 is described in the inventive example.

FIG. 11A is a diagram showing an irradiation area of signal light passing through the light flux areas a through h, in the case where the positions of the sensors B1 through B8 are not displaced. FIG. 11A shows a state that the focus position of laser light is adjusted on a target recording layer. As shown in FIG. 11A, in this state, signal light passing through the light flux areas a through h is uniformly irradiated onto each sensor.

FIGS. 11B, 11C are enlarged views showing an irradiation area near the sensors B1, B2, and an irradiation area near the sensors B4, B6 in the state shown in FIG. 11A. As shown in FIGS. 11B, 11C, a slight clearance is formed between the sensors B1, B2, and between the sensors B4, B6. Likewise, a slight clearance is formed between the sensors B3, B5, and between the sensors B7, B8.

As shown in FIG. 11B, the irradiation area a is shifted downward from the irradiation area a shown in FIG. 7B, and the irradiation area h is shifted upward from the irradiation area h shown in FIG. 7B. The irradiation areas a, h respectively and uniformly overlap the sensors B1, B2. Further, as shown in FIG. 11C, the irradiation area b is shifted rightward from the irradiation area b shown in FIG. 7C, and the irradiation area c is shifted leftward from the irradiation area c shown in FIG. 7C. The irradiation areas b, c respectively and uniformly overlap the sensors B6, B4.

Likewise, the irradiation areas f, g are respectively shifted leftward and rightward from the irradiation areas f, g shown in FIG. 7A, and respectively and uniformly overlap the sensors B3, B5. Further, the irradiation areas d, e are respectively shifted downward and upward from the irradiation areas d, e shown in FIG. 7A, and respectively and uniformly overlap the sensors B7, B8.

FIG. 11D is a diagram showing irradiation areas of signal light passing through the light flux areas a through h, in the case where the positions of the sensors B1 through B8 are displaced from the state shown in FIG. 11A in a direction (leftward or rightward direction) perpendicular to the direction of a track image. As shown in FIG. 11D, although the irradiation areas are the same as those in the state shown in FIG. 11A, since the positions of the sensors B1 through B8 are displaced leftward, the irradiation areas in the state shown in FIG. 11D are displaced rightward within the sensors B1 through B8.

FIG. 11E is an enlarged view showing irradiation areas near the sensors B1, B2 in the state shown in FIG. 11D. As shown in FIG. 11E, although the irradiation areas a, h are respectively displaced rightward from the sensors B1, B2, the irradiation areas a, h respectively and uniformly overlap the sensors B1, B2 in the same manner as the state shown in FIG. 11B. Accordingly, the output signals from the sensors B1, B2 in the state shown in FIG. 11E are substantially the same as the output signals from the sensors B1, B2 in the state shown in FIG. 11A. Likewise, the output signals from the sensors B7, B8 in the state shown in FIG. 11E are substantially the same as the output signals from the sensors B7, B8 in the state shown in FIG. 11A.

FIG. 11F is an enlarged view showing irradiation areas near the sensors B4, B6 in the state shown in FIG. 11D. As shown in FIG. 11F, the irradiation area b lies within the sensor B6 in the same manner as the state shown in FIG. 11C. Likewise, the irradiation area c lies within the sensor B4 in the same manner as the state shown in FIG. 11C. Accordingly, the output signals from the sensors B4, B6 in the state shown in FIG. 11F are substantially the same as the output signals from the sensors B4, B6 in the state shown in FIG. 11A. Likewise, the output signals from the sensors B3, B5 in the state shown in FIG. 11F are substantially the same as the output signals from the sensors B3, B5 in the state shown in FIG. 11A.

Further, even in the case where the positions of the sensors B1 through B8 are displaced rightward substantially by the same displacement amount as the state shown in FIG. 11D, the output signals from the sensors B1 through B8 are kept substantially unchanged in the same manner as the states shown in FIGS. 11D through 11F. Further, even in the case where the positions of the sensors B1 through B8 are displaced in a direction (upward or downward direction) in parallel to the direction of a track image substantially by the same displacement amount as the state shown in FIG. 11D, the output signals from the sensors B1 through B8 are also kept substantially unchanged.

As described above, in the inventive example, even in the case where the positions of the sensors B1 through B8 are displaced, the output signals from the sensors B1 through B8 are substantially kept unchanged, as compared with a state before displacement occurs. In order to obtain the above advantage, it is desirable to set the clearance between the two irradiation areas positioned at four vertex portions of the signal light area larger than the clearance between the two sensors corresponding to the two irradiation areas, as described in the inventive example. The clearance between the two irradiation areas is properly adjusted by adjusting the directions Va through Vh shown in FIG. 9A.

Next, FIGS. 12A through 12D, and FIGS. 13A through 13D respectively show a simulation result of an irradiation area on the sensor layout in the inventive example, in the case based on the above principle, and in the case where the spectral element 118 in the inventive example is used.

FIGS. 12A through 12D are respectively enlarged views of a left portion, an upper portion, a right portion, and a lower portion of the sensor layout, showing an irradiation area of signal light on the light receiving surface in the case based on the above principle. As shown in FIGS. 7A through 7C, the irradiation areas a through h of signal light in the case based on the above principle are positioned on the sensors B1 through B8. As a result, as described above referring to FIGS. 7D through 7F, if the positions of the sensors B1 through B8 are displaced, the output signals from the sensors B1 through B8 are changed.

FIGS. 13A through 13D are enlarged views of a left portion, an upper portion, a right portion, and a lower portion of the sensor layout, showing an irradiation area of signal light on the light receiving surface in the case where the spectral element 118 in the inventive example is used. As shown in FIGS. 11A through 11C, the irradiation areas a through h of signal light in the case where the spectral element 118 in the inventive example is used, are positioned on the sensors B1 through B8. Accordingly, as described above referring to FIGS. 11D through 11F, even if the positions of the sensors B1 through B8 are displaced substantially by the displacement amount as shown in FIG. 11D, the output signals from the sensors B1 through B8 are kept unchanged.

As described above, according to the inventive example, as shown in FIG. 10A, the irradiation area of signal light of BD light is distributed on the inside of the four vertex portions of the signal light area, and the irradiation areas of stray light 1, 2 of BD light are distributed on the outside of the signal light area substantially in the same manner as the state shown in FIG. 4B. Accordingly, it is possible to receive only signal light of BD light by the sensors B1 through B8 shown in FIG. 9B. Thus, it is possible to suppress degradation of a detection signal resulting from stray light.

Further, according to the inventive example, even if the positions of the sensors B1 through B8 are displaced substantially by the displacement amount shown in FIG. 11D, unlike the case based on the above principle, the output signal from each sensor is kept unchanged. Thus, even if the positions of the sensors B1 through B8 are displaced substantially by the displacement amount shown in FIG. 11D by e.g. aging deterioration, there is no or less likelihood that the output signals from the sensors B1 through B8 may be degraded.

The inventive example is advantageous even in the case where a positional displacement amount of the sensors B1 through B8 is larger than the positional displacement amount shown in FIG. 11D, and the signal light area to be formed by signal light of BD light is deviated from a rectangle defined by the vertices on the outside of the sensor layout. Specifically, in the inventive example, even in the case where positional displacement of the sensors B1 through B8 is large, the amount by which each of the irradiation areas is deviated from a corresponding sensor, and the amount by which each of the irradiation areas overlaps a sensor adjacent to the corresponding sensor are decreased, as compared with the case based on the above principle. Thus, it is possible to keep the precision of output signals from the sensors B1 through B8 in the inventive example high, as compared with the case based on the above principle.

The example of the invention has been described as above. The invention is not limited to the foregoing example, and the example of the invention may be modified in various ways other than the above.

For instance, in the inventive example, BD light is separated by using the spectral element 118 having a diffraction pattern on a light incident surface thereof. Alternatively, BD light may be separated by using a spectral element constituted of a multifaceted prism, in place of using the spectral element 118. Eight surfaces corresponding to the diffraction areas 118a through 118h of the spectral element 118 are formed on a light incident surface of the multifaceted prism. Light to be entered into the eight surfaces are refracted in the directions Va through Vh shown in FIG. 9A. Thus, signal light of BD light is irradiated onto the light receiving surface as shown in FIG. 10A in the same manner as the case where the spectral element 118 is used.

In the case where a spectral element constituted of a multifaceted prism is used, the optical system for receiving BD light, and the optical system for receiving CD light and DVD light are individually constructed. Specifically, BD light is guided to the BD objective lens 117 shown in FIG. 8B by the optical system for BD, and CD light and DVD light are guided to the dual wavelength objective lens 116 by the optical system for CD/DVD which is constructed independently of the optical system for BD. The optical system for BD has a laser light source for emitting BD light, and one photodetector for receiving BD light reflected on BD. The optical system for CD/DVD has a laser light source for emitting CD light and DVD light, and a photodetector other than the photodetector for BD light and for receiving CD light, DVD light reflected on CD, DVD. The photodetector for CD/DVD has two sensor groups for individually receiving CD light and DVD light. Similarly to the inventive example, the optical system for BD is provided with an anamorphic lens for imparting astigmatism to BD light reflected on BD. The spectral element constituted of a multifaceted prism is disposed anterior to the anamorphic lens.

Furthermore, in the inventive example, the spectral element 118 is disposed anterior to the anamorphic lens 119. Alternatively, the spectral element 118 may be disposed posterior to the anamorphic lens 119, or a diffraction pattern for imparting the same diffraction function as the spectral element 118 to laser light may be integrally formed on an incident surface or an output surface of the anamorphic lens 119.

Figure 10B:
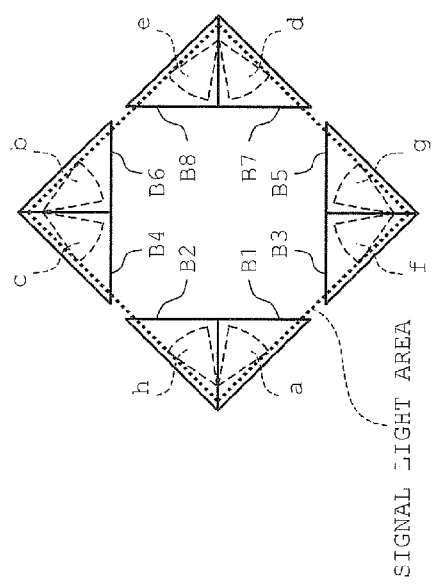

Further, in the inventive example, the spectral element 118 may be provided with a lens function. Specifically, the phase function representing the diffraction function of the diffraction areas 118a through 118h of the spectral element 118 may be provided with a square term. With the modification, as shown in FIG. 10B, for instance, it is possible to set ends of the two irradiation areas positioned at the four vertices of the signal light area, which are on the near side of the corresponding vertex of the signal light area, closer to each other.

In the following, an output signal from each sensor resulting from positional displacement of the sensors B1 through B8 is described, in the case where the spectral element 118 has a lens function, referring to FIGS. 14A through 14F.

Figure 14C:
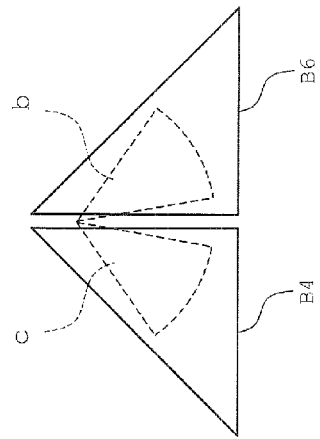
FIGS. 14A through 14F are diagrams for describing an output signal from each sensor resulting from positional displacement of sensors in the modification example.
Figure 14F:
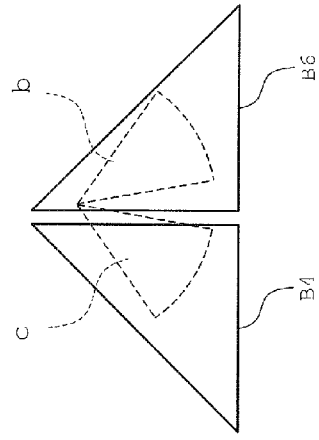
Figure 14B:
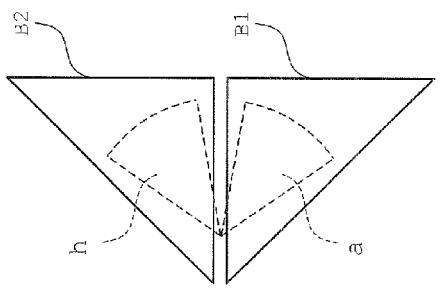
Figure 14E:
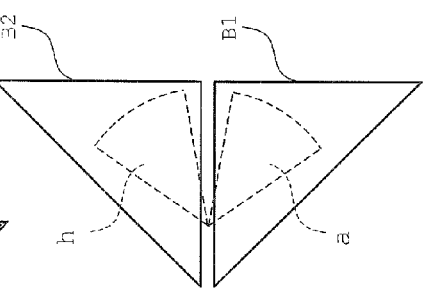
Figure 14A:
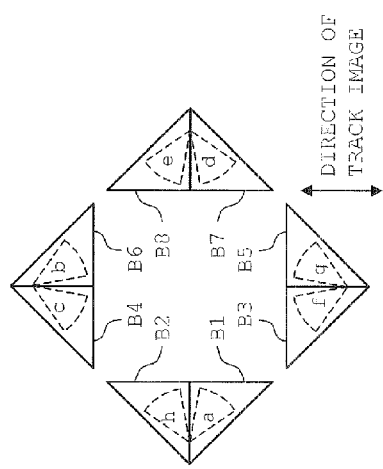

FIG. 14A is a diagram showing an irradiation area of signal light passing through the light flux areas a through h, in the case where the positions of the sensors B1 through B8 are not displaced. FIG. 14A shows a state that the focus position of laser light is adjusted on a target recording layer. In this state, as shown in FIG. 14A, signal light passing through the light flux areas a through h is uniformly irradiated onto each sensor.

FIGS. 14B, 14C are enlarged views respectively showing an irradiation area near the sensors B1, B2, and an irradiation area near the sensors B4, B6 in the state shown in FIG. 14A.

As shown in FIG. 14B, left ends of the irradiation areas a, h are respectively shifted upward and downward from the irradiation areas a, h shown in FIG. 11B, and are positioned in the clearance between the sensors B1 and B2. The irradiation areas a, h respectively and uniformly overlap the sensors B1, B2. As shown in FIG. 14C, upper ends of the irradiation areas b, c are respectively shifted leftward and rightward from the irradiation areas b, c shown in FIG. 11C, and are positioned in the clearance between the sensors B6 and B4. The irradiation areas b, c respectively and uniformly overlap the sensors B6, B4.

Likewise, lower ends of the irradiation areas f, g are respectively shifted rightward and leftward from the irradiation areas f, g shown in FIG. 11A, and are positioned in the clearance between the sensors B3 and B5. The irradiation areas f, g respectively and uniformly overlap the sensors B3, B5. Further, the irradiation areas d, e are respectively shifted upward and downward from the irradiation areas d, e shown in FIG. 11A, and are positioned in the clearance between the sensors B7 and B8. The irradiation areas d, e respectively and uniformly overlap the sensors B7, B8.

Figure 14D:
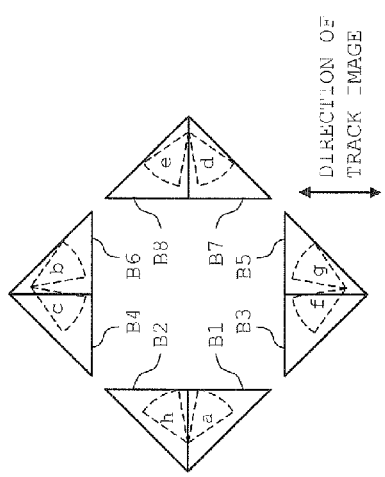
Figure 15B:
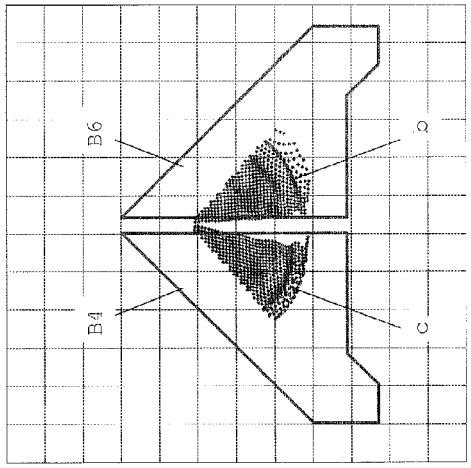
FIGS. 15A through 15D are diagrams showing a simulation result of an irradiation area in the case where a spectral element in the modification example is used.
Figure 15D:
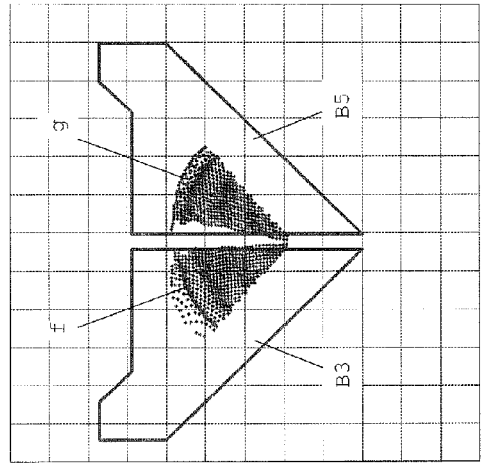
Figure 15A:
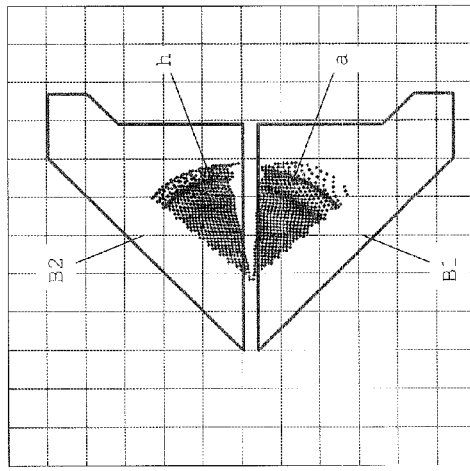
Figure 15C:
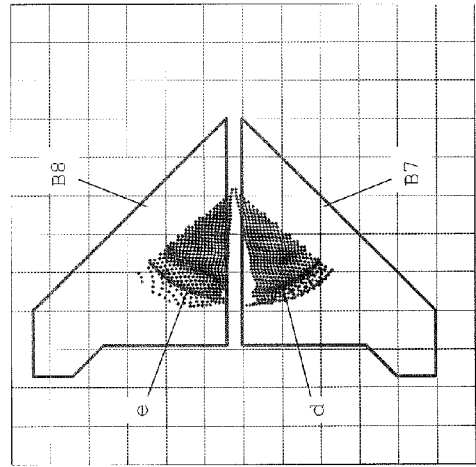
Figure 16B:
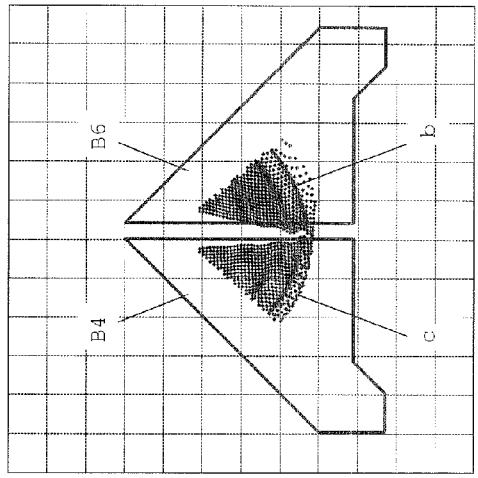
FIGS. 16A through 16D are diagram showing a simulation result of an irradiation area in the case where the spectral element in the modification example is used.
Figure 16D:
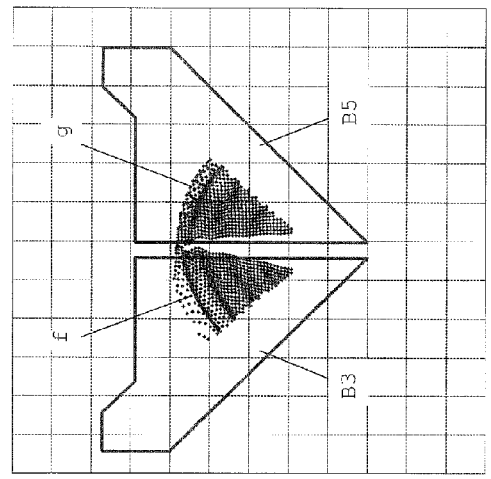
Figure 16A:
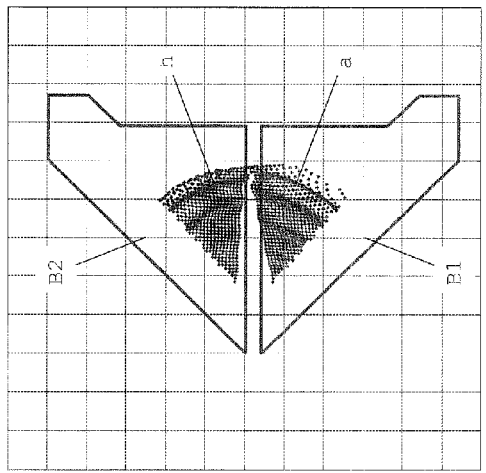
Figure 16C:
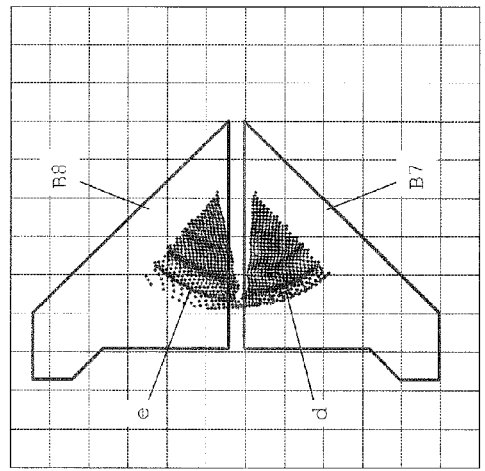

FIG. 14D is a diagram showing irradiation areas of signal light passing through the light flux areas a through h, in the case where the positions of the sensors B1 through B8 are displaced from the state shown in FIG. 14A in a direction (leftward or rightward direction) perpendicular to the direction of a track image.

FIG. 14E is an enlarged view showing irradiation areas near the sensors B1, B2 in the state shown in FIG. 14D. As shown in FIG. 14E, although the irradiation areas a, h are respectively displaced rightward from the sensors B1, B2, the irradiation areas a, h respectively and uniformly overlap the sensors B1, B2 in the same manner as the state shown in FIG. 14B. Accordingly, the output signals from the sensors B1, B2 in the state shown in FIG. 14E are substantially the same as the output signals from the sensors B1, B2 in the state shown in FIG. 14A. Likewise, the output signals from the sensors B7, B8 in the state shown in FIG. 14E are substantially the same as the output signals from the sensors B7, B8 in the state shown in FIG. 14A.

FIG. 14F is an enlarged view showing irradiation areas near the sensors B4, B6 in the state shown in FIG. 14D. As shown in FIG. 14F, unlike the state shown in FIG. 14C, an upper end of the irradiation area b is positioned on the sensor B6. Further, unlike the state shown in FIG. 14C, an upper end of the irradiation area c is deviated rightward of the sensor B4, and is positioned on the sensor B6. With this arrangement, the output signal from the sensor B6 is increased, and the output signal from the sensor B4 is decreased, as compared with the state shown in FIG. 14A. Likewise, the output signal from the sensor B5 is increased, and the output signal from the sensor B3 is decreased, as compared with the state shown in FIG. 14A.

However, increased amounts of output signals from the sensors B6, B5, and decreased amounts of output signals from the sensors B4, B3 are small, as compared with the case based on the above principle. Accordingly, even if the positions of the sensors B1 through B8 are displaced, it is possible to suppress lowering of the precision of output signals from the sensors B3 through B6, as compared with the case based on the above principle.

Further, even in the case where the positions of the sensors B1 through B8 are displaced rightward substantially by the same displacement amount as the state shown in FIG. 14D, although the output signals from the sensors B3 through B6 are changed, it is possible to suppress lowering the precision of output signals from the sensors B3 through B6, as compared with the case based on the above principle. Further, even in the case where the positions of the sensors B1 through B8 are displaced in a direction (upward or downward direction) in parallel to the direction of a track image substantially by the same displacement amount as the state shown in FIG. 14D, although the output signals from the sensors B1, B2, B7, B8 are changed, it is possible to suppress lowering the precision of output signals from the sensors B1, B2, B7, B8, as compared with the case based on the above principle.

Further, if the positions of the sensors B1 through B8 are displaced leftward or rightward, the balance between output signals from the sensors B4, B6 is changed, and the balance between output signals from the sensors B3, B5 is changed. If the positions of the sensors B1 through B8 are displaced upward or downward, the balance between output signals from the sensors B1, B2 is changed, and the balance between output signals from the sensors B7, B8 is changed. With this arrangement, it is possible to detect positional displacement amounts of the sensors B1 through B8 in upward and downward directions and leftward and rightward directions, based on imbalance amounts of output signals from the sensors B1, B2, the sensors B4, B6, the sensors B3, B5, and the sensors B7, B8. Thus, it is possible to adjust the positions of the sensors B1 through B8 by referring to the balance of output signals e.g. at the time of assembling an optical pickup device to thereby properly dispose the sensors B1 through B8.

Figure 10C:
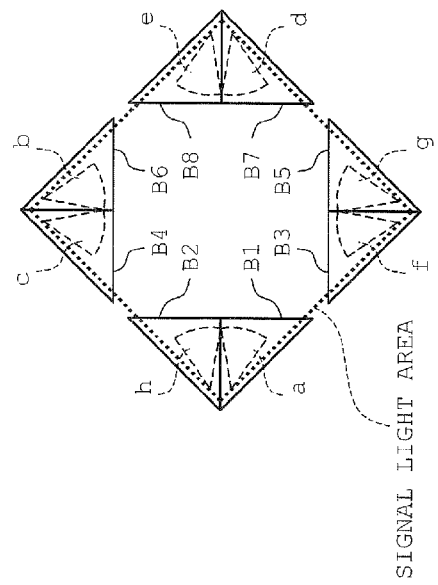
Figure 12B:
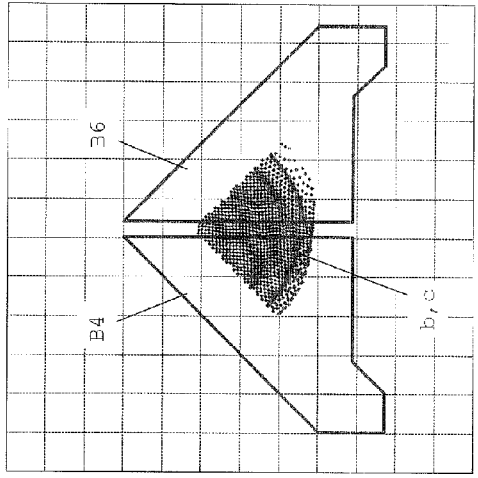
FIGS. 12A through 12D are diagrams showing a simulation result of an irradiation area in the case based on the technical principle of the embodiment.
Figure 12D:
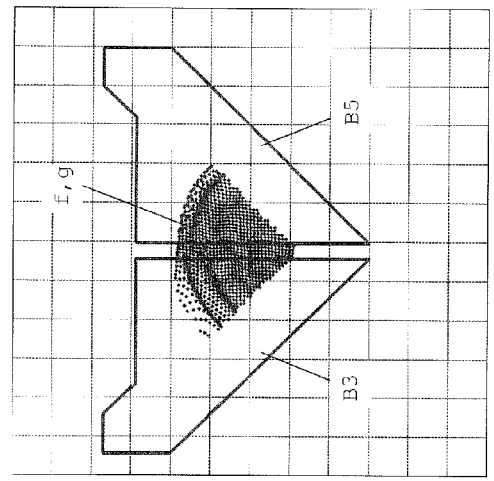
Figure 12A:
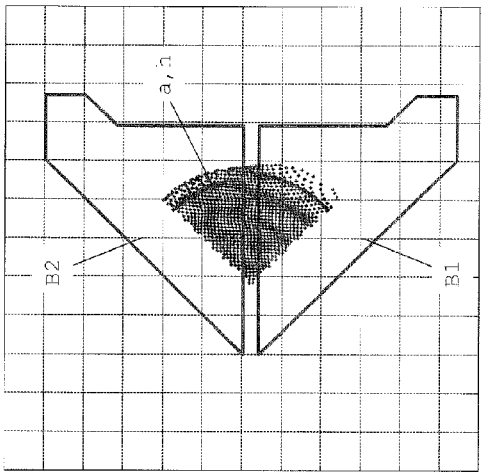
Figure 12C:
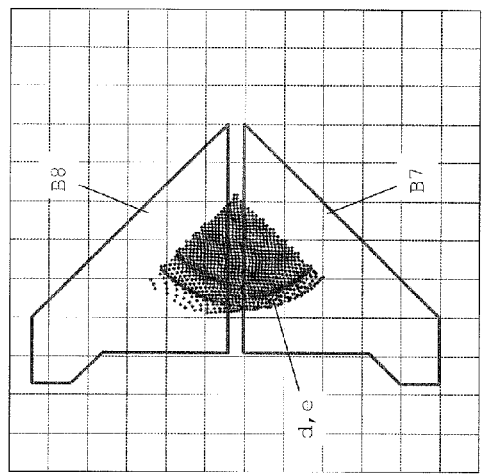
Figure 13B:
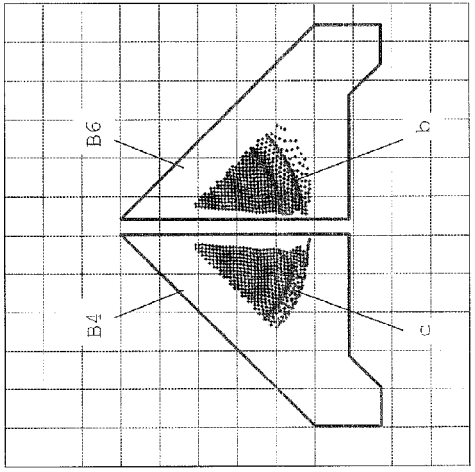
FIGS. 13A through 13D are diagrams showing a simulation result of an irradiation area in the case where the spectral element in the inventive example is used.
Figure 13D:
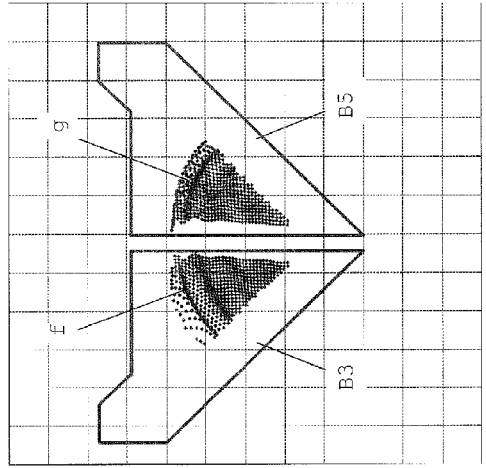
Figure 13A:
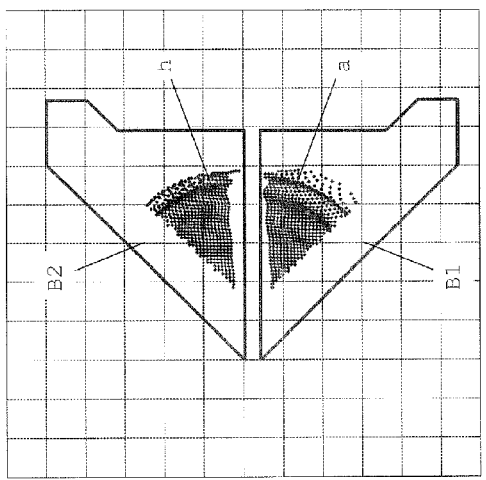
Figure 13C:
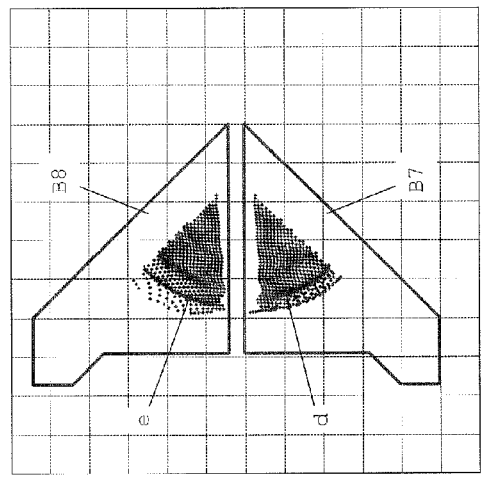

In the case where the spectral element 118 has a lens function, as shown in FIG. 10C, the spectral element 118 may be configured such that ends of the two irradiation areas positioned at four vertices of the signal light area, which are on the far side of the corresponding vertex of the signal light area, are set close to each other. In this arrangement, it is also possible to obtain substantially the same advantage as the case where the irradiation area is distributed in the state as shown in FIG. 10B.

Next, a simulation result of an irradiation area on the sensor layout is described, in the case where the irradiation area is distributed as shown in FIGS. 10B and 10C, referring to FIGS. 15A through 15D, and FIGS. 16A through 16D.

FIGS. 15A through 15D are respectively enlarged views of a left portion, an upper portion, a right portion, and a lower portion of the sensor layout, in the case where the irradiation area is distributed as shown in FIG. 10B. The irradiation areas a through h in the above case are positioned on the sensors B1 through B8, as shown in FIGS. 14A through 14C. Accordingly, as described above referring to FIGS. 14D through 14F, although the output signals from the sensors B1 through B8 are changed resulting from positional displacement of the sensors B1 through B8, it is possible to suppress lowering of the precision of output signals from the sensors B1 through B8, as compared with the case based on the above principle. Further, in the above case, it is possible to properly dispose the sensors B1 through B8 by determining positional displacement of the sensors B1 through B8 in upward and downward directions and leftward and rightward directions, based on the balance of output signals from the sensors B1 through B8.

FIGS. 16A through 16D are respectively enlarged views of a left portion, an upper portion, a right portion, and a lower portion of the sensor layout, in the case where the irradiation area is distributed as shown in FIG. 10C. In this case, although the output signals from the sensors B1 through B8 are changed resulting from positional displacement of the sensors B1 through B8 in the same manner as the state shown in FIG. 10B, it is possible to suppress lowering of the precision of output signals from the sensors B1 through B8, as compared with the case based on the above principle. Further, in the above case, it is possible to properly dispose the sensors B1 through B8 by determining positional displacement of the sensors B1 through B8 in upward and downward directions and leftward and rightward directions, based on the balance of output signals from the sensors B1 through B8.

Further, in the inventive example, as shown in FIG. 9A, the diffraction areas 118a through 118h are set in such a manner that the light transmissive surface of the spectral element 118 having a square shape is equally divided into eight areas. Alternatively, for instance, as shown in FIGS. 17A, 17B, the spectral element 118 may be configured such that four diffraction areas disposed in a direction along which a pair of vertically opposite angles defined by two straight lines respectively in parallel to the flat surface direction and the curved surface direction and perpendicularly intersecting with each other (namely, two diagonal lines of the spectral element 118) are aligned, are set larger than the remaining four diffraction areas disposed in a direction along which the other pair of vertically opposite angles defined by the two straight lines are aligned.

Figure 17A:
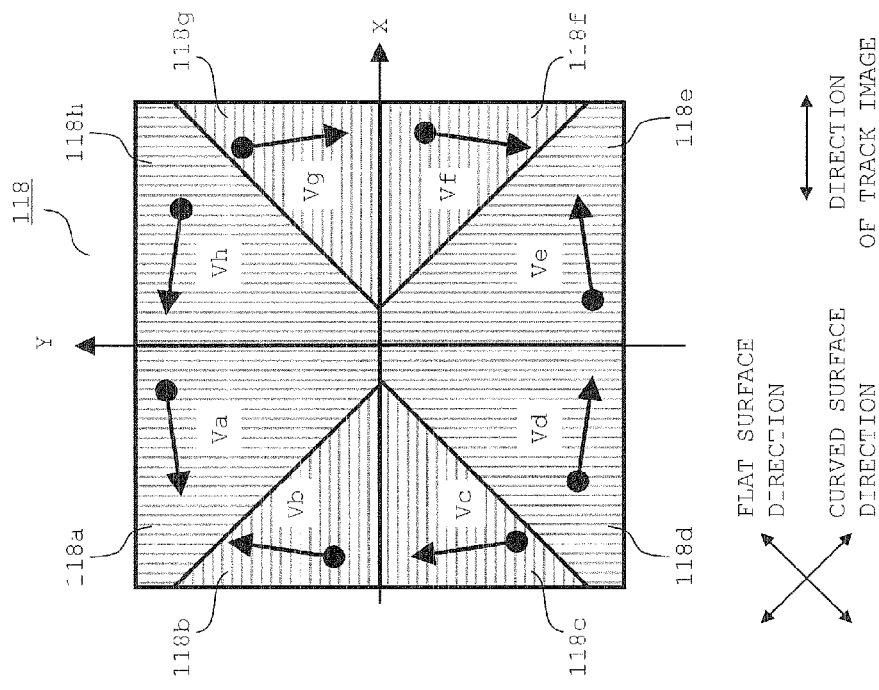
FIGS. 17A and 17B are diagrams showing an arrangement of a spectral element in another modification example.
Figure 17B:
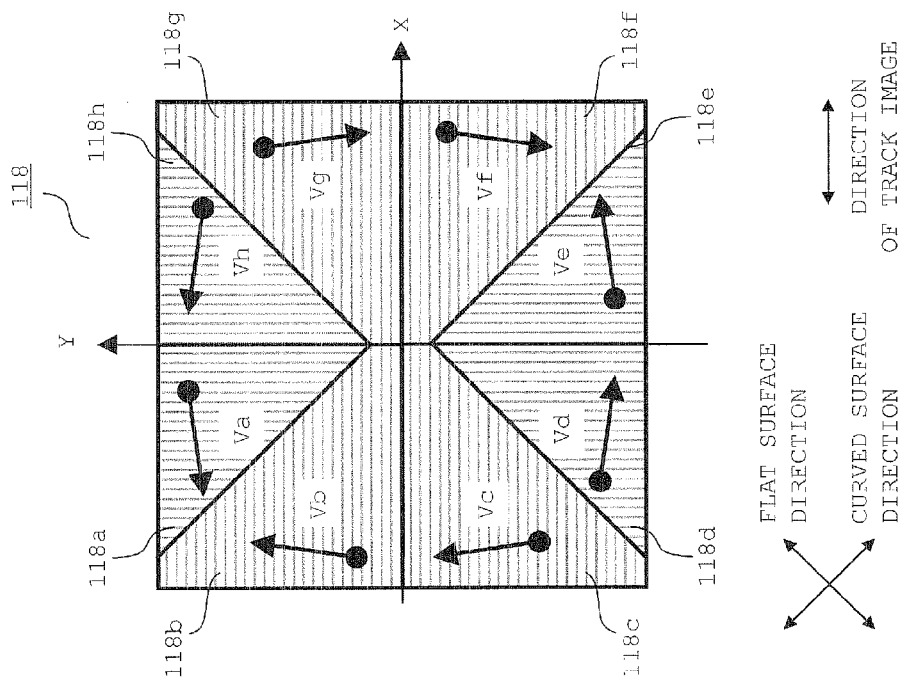

In the arrangement example shown in FIG. 17A, the diffraction areas 118b, 118c, and the diffraction areas 118f, 118g are set larger than the diffraction areas 118a, 118h, and the diffraction areas 118d, 118e. Further, in the arrangement example shown in FIG. 17B, the diffraction areas 118a, 118h, and the diffraction areas 118d, 118e are set larger than the diffraction areas 118b, 118c, and the diffraction areas 118f, 118g. In the arrangements shown in FIGS. 17A, 17B, the diffraction areas 118a through 118h are symmetrical with respect to X-axis and Y-axis. Further, any of the borderline between the diffraction areas 118a, 118b, the borderline between the diffraction areas 118c, 118d, the borderline between the diffraction areas 118e, 118f, and the borderline between the diffraction areas 118g, 118h intersects with X-axis and Y-axis at an angle of 45° (namely, in parallel to the flat surface direction or the curved surface direction). The diffraction function of the diffraction areas 118a through 118h are the same as the inventive example.

In the above arrangement, since stray light components at portions deviated from the two diagonal lines of the spectral element 118 overlap signal light, a detection signal may be slightly degraded, as compared with the inventive example. However, stray light is significantly removed, as compared with the conventional arrangement shown in FIG. 5B.

Further, in the inventive example, as shown in FIG. 9A, the diffraction areas 118a through 118h are set in such a manner that the light transmissive surface of the spectral element 118 having a square shape is equally divided into eight areas by the two diagonal lines of the spectral element 118, and by the two straight lines intersecting with the two diagonal lines at an angle of 45 degrees. Alternatively, the light transmissive surface of the spectral element 118 may be divided into eight areas by strips each having a predetermined width.

Figure 18A:
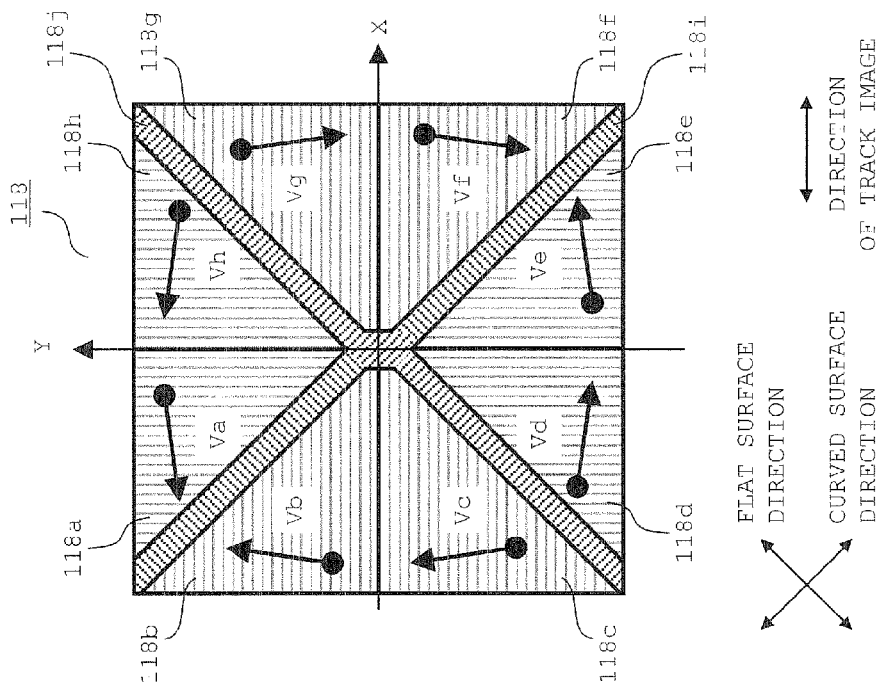
FIGS. 18A and 18B are diagrams showing an arrangement of a spectral element in still another modification example.
Figure 18B:
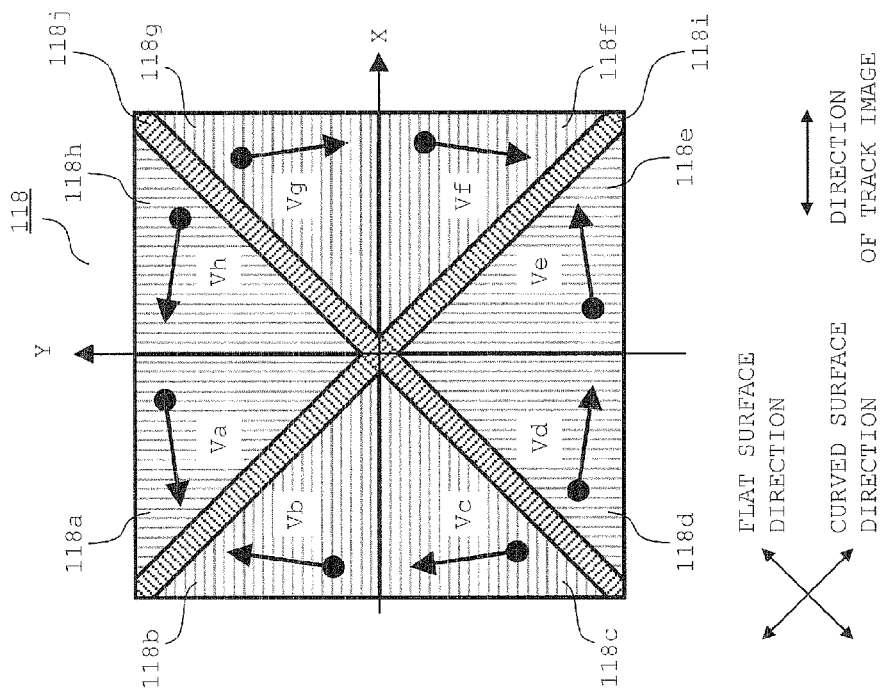

FIGS. 18A, 18B are diagrams showing an arrangement example, in the case where eight diffraction areas 118a through 118h are set by dividing the light transmissive surface of the spectral element 118 by light blocking strips 118i, 118j each having a predetermined width.

In the arrangement example shown in FIG. 18A, the light blocking strips 118i, 118j are formed on diagonal lines of the spectral element 118. Further, in the arrangement example shown in FIG. 18B, the light blocking strips 118i, 118j are formed in such a manner that the diffraction areas 118b, 118c, and the diffraction areas 118f, 118g are set larger than the diffraction areas 118a, 118h, and the diffraction areas d, 118e. In the arrangements shown in FIGS. 18A, 18B, the diffraction areas 118a through 118h are symmetrical with respect to X-axis and Y-axis. Further, any of the light blocking strips 118*i*, 118*j* between the diffraction areas 118*a*, 118*b*, between the diffraction areas 118*c*, 118*d*, between the diffraction areas 118*e*, 118*f*, and between the diffraction areas 118*g*, 118*h* intersects with X-axis and Y-axis at an angle of 45° (namely, in parallel to the flat surface direction or the curved surface direction). The diffraction function of the diffraction areas 118*a* through 118*h* are the same as the inventive example.

The light blocking strips 118*i*, 118*j* have a step structure configured such that plus first-order diffraction efficiency is set high with respect to the wavelength of BD light, and that zero-th order diffraction efficiency is set high with respect to the wavelengths of CD light and DVD light, as well as the diffraction areas 118*a* through 118*h*. The diffraction direction and the diffraction angle of the light blocking strip 118*i*, 118*j* are set in such a manner that BD light entered into the light blocking strips 118*i*, 118*j* is not entered into the sensors B1 through B8.

In the arrangement examples shown in FIGS. 18A, 18B, the light blocking strips 118*i*, 118*j* may be replaced by transparent strips (a transparent area). In this case, it is desirable to adjust the transmittance of the transparent area in such a manner that the light amounts of CD light and DVD light transmitted through the diffraction areas 118*a* through 118*h* are substantially equal to the light amounts of CD light and DVD light transmitted through the transparent area.

The embodiment of the invention may be changed or modified in various ways as necessary, as far as such changes and modifications do not depart from the scope of the claims of the invention hereinafter defined.

What is claimed is:

1. An optical pickup device, comprising:
a laser light source;
an objective lens which focuses laser light emitted from the laser light source on a recording medium;
an astigmatism element which converges the laser light in a first direction to generate a first focal line, and which converges the laser light in a second direction perpendicular to the first direction to generate a second focal line;
a spectral element which makes propagating directions of light fluxes, in four different light flux areas, of the laser light reflected on the recording medium, different from each other to disperse the light fluxes in the four light flux areas from each other; and
a photodetector which receives the dispersed light fluxes to output a detection signal, wherein
the spectral element sets the four light flux areas in such a manner that, assuming that an intersection of first and second straight lines respectively in parallel to the first direction and the second direction and perpendicularly intersecting with each other is aligned with an optical axis of the laser light, two of the light flux areas are disposed in a direction along which a pair of vertically opposite angles defined by the first and second straight lines are aligned, and that the other two of the light flux areas are disposed in a direction along which the other pair of vertically opposite angles defined by the first and second straight lines are aligned,
the spectral element further sets propagating directions of divided elements of each of the light fluxes so as to disperse the divided elements on the photodetector, the divided elements being obtained by dividing each of the light fluxes into two parts by a third straight line intersecting with the first and second straight lines at an angle of 45 degrees, or by a fourth straight line orthogonal to the third straight line, and
the photodetector is provided with sensors which individually receive the divided elements of each of the light fluxes.

2. The optical pickup device according to claim 1, wherein the spectral element sets the propagating directions of the divided elements in such a manner that a clearance, on the photodetector, between each pair of the divided elements is set larger than a clearance between the two sensors which receive the corresponding pair of divided elements.

3. The optical pickup device according to claim 1, wherein the spectral element gives an optical function to the divided elements, the optical function being operative to gradually decrease a clearance, on the photodetector, between each pair of the divided elements in a direction of a parting line of the two sensors which receive the corresponding pair of divided elements.

4. The optical pickup device according to claim 3, wherein a part of the clearance, on the photodetector, between each pair of the divided elements is set smaller than a clearance between the two sensors which receives the corresponding pair of divided elements.

5. The optical pickup device according to claim 1, wherein the spectral element changes the propagating directions of the light fluxes in the four light flux areas so that the dispersed light fluxes are guided to four respective different vertex positions of a rectangle, on a light receiving surface of the photodetector.

* * * * *